(12) United States Patent
Stanley et al.

(10) Patent No.: US 6,598,900 B2
(45) Date of Patent: Jul. 29, 2003

(54) OCCUPANT DETECTION SYSTEM

(75) Inventors: James G. Stanley, Novi, MI (US); Robert A. Stopper, Jr., Plymouth, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 62 days.

(21) Appl. No.: 09/875,650

(22) Filed: Jun. 6, 2001

(65) Prior Publication Data

US 2002/0003345 A1 Jan. 10, 2002

Related U.S. Application Data

(63) Continuation-in-part of application No. 09/474,473, filed on Dec. 29, 1999, now Pat. No. 6,517,106, and a continuation-in-part of application No. 09/474,673, filed on Dec. 29, 1999, now Pat. No. 6,283,504, and a continuation-in-part of application No. 09/474,470, filed on Dec. 29, 1999, and a continuation-in-part of application No. 09/294,680, filed on Apr. 19, 1999, now Pat. No. 6,290,255.

(60) Provisional application No. 60/209,671, filed on Jun. 6, 2000.

(51) Int. Cl.⁷ ............................................. B60R 21/32

(52) U.S. Cl. ...................................... 280/735; 701/45

(58) Field of Search ............................ 280/734, 735; 180/271; 701/45; 307/10.1; 242/72

(56) References Cited

U.S. PATENT DOCUMENTS

| | | | | |
|---|---|---|---|---|
| 4,833,393 A | | 5/1989 | Wetzel .................... 324/60 SD |
| 5,363,051 A | | 11/1994 | Jenstrom et al. ............. 324/661 |
| 5,411,289 A | | 5/1995 | Smith et al. ................ 280/735 |
| 5,528,698 A | | 6/1996 | Kamei ........................ 382/100 |
| 5,531,472 A | | 7/1996 | Semchena et al. .......... 280/735 |
| 5,626,359 A | | 5/1997 | Steffens, Jr. et al. ........ 280/735 |
| 5,653,462 A | * | 8/1997 | Breed et al. ................. 180/272 |
| 5,782,485 A | * | 7/1998 | Takeda et al. ............... 280/735 |
| 5,785,347 A | * | 7/1998 | Adolph et al. ............... 180/273 |
| 5,831,342 A | * | 11/1998 | Vivacqua et al. ............ 180/273 |
| 5,844,486 A | * | 12/1998 | Kithil et al. ................. 280/735 |
| 5,871,232 A | * | 2/1999 | White ......................... 280/735 |
| 5,964,478 A | | 10/1999 | Stanley et al. ............... 280/735 |
| 6,020,812 A | * | 2/2000 | Thompson et al. ......... 180/273 |
| 6,027,138 A | | 2/2000 | Tanaka et al. ............... 280/735 |
| 6,029,105 A | * | 2/2000 | Schweizer ................... 280/734 |
| 6,031,380 A | | 2/2000 | Gleixner et al. ............. 324/683 |
| 6,078,854 A | | 6/2000 | Breed et al. ................... 701/49 |
| 6,079,738 A | | 6/2000 | Lotito et al. ................. 280/735 |
| 6,081,757 A | | 6/2000 | Breed et al. ................... 701/45 |
| 6,094,610 A | * | 7/2000 | Steffens et al. ............. 280/735 |
| 6,099,030 A | * | 8/2000 | Kraft .......................... 180/272 |
| 6,113,137 A | | 9/2000 | Mizutani et al. ............ 280/735 |
| 6,116,639 A | | 9/2000 | Breed et al. ................. 280/735 |
| 6,135,494 A | | 10/2000 | Lotito et al. ................. 280/731 |
| 6,158,768 A | | 12/2000 | Steffens, Jr. et al. ........ 280/735 |
| 6,161,070 A | | 12/2000 | Jinno et al. ................... 701/45 |
| 6,168,198 B1 | | 1/2001 | Breed et al. ................. 280/735 |
| 6,186,537 B1 | | 2/2001 | Breed et al. ................. 280/735 |

(List continued on next page.)

Primary Examiner—Brian L. Johnson
Assistant Examiner—Christopher Bottorff
(74) Attorney, Agent, or Firm—Dinnin & Dunn, P.C.

(57) ABSTRACT

An occupant detection system incorporates a radar range sensor adapted to sense the position of an occupant in a vehicle. The activation of the radar range sensor is responsive to the proximity of the occupant to a restraint actuator, or to an occupant sensor adapted to sense the presence or position of the occupant on a seat. The radar range sensor is disabled and the restraint actuator is enabled responsive to an occupant seated proximate to the seat back as sensed by a range/proximity sensor. The radar range sensor is disabled and the restraint actuator is disabled responsive to an infant or child in and infant or child seat on the vehicle seat sensed by an electric field sensor or a seat weight sensor. The radar range sensor is enabled and the restraint actuator is controlled responsive thereto if the occupant is on the seat but not proximate to the seat back.

22 Claims, 11 Drawing Sheets

U.S. PATENT DOCUMENTS

| | | | |
|---|---|---|---|
| 6,186,538 B1 | 2/2001 | Hamada et al. | 280/735 |
| 6,196,579 B1 | 3/2001 | Bowers et al. | 280/735 |
| 6,199,901 B1 | 3/2001 | Iizuka | 280/735 |
| 6,199,902 B1 | 3/2001 | Cooper et al. | 280/735 |
| 6,199,904 B1 | 3/2001 | Dosdall | 280/735 |
| 6,206,416 B1 | 3/2001 | Faigle et al. | 280/735 |
| 6,208,249 B1 | 3/2001 | Saito et al. | 340/561 |
| 6,220,627 B1 | 4/2001 | Stanley | 280/735 |
| 6,224,095 B1 | 5/2001 | Schifflechner | 280/735 |
| 6,227,564 B1 | 5/2001 | Ikegami | 280/735 |
| 6,234,520 B1 | 5/2001 | Breed et al. | 280/735 |
| 6,254,127 B1 | 7/2001 | Breed et al. | 280/735 |
| 6,270,114 B2 | 8/2001 | Mai et al. | 280/735 |
| 6,290,255 B1 * | 9/2001 | Stanley et al. | 180/271 |
| 6,356,187 B2 * | 3/2002 | Jinno et al. | 180/271 |
| 6,431,592 B2 * | 8/2002 | Seip | 280/730.2 |

* cited by examiner

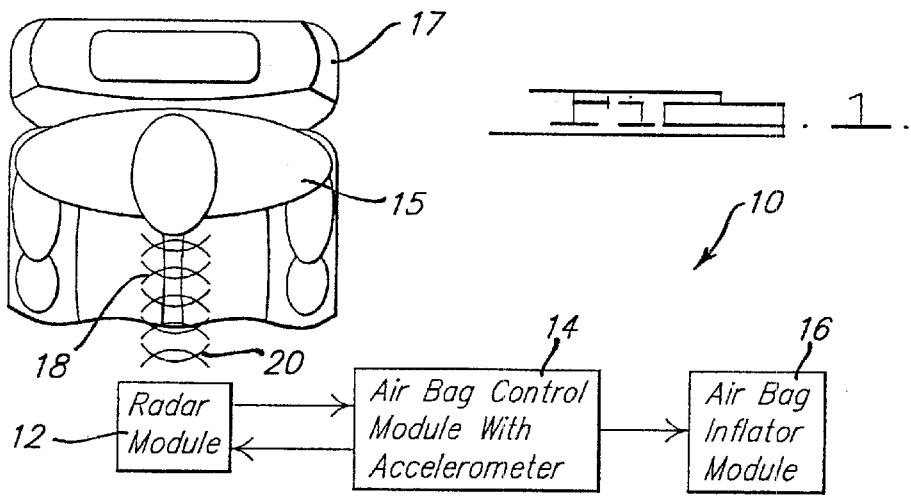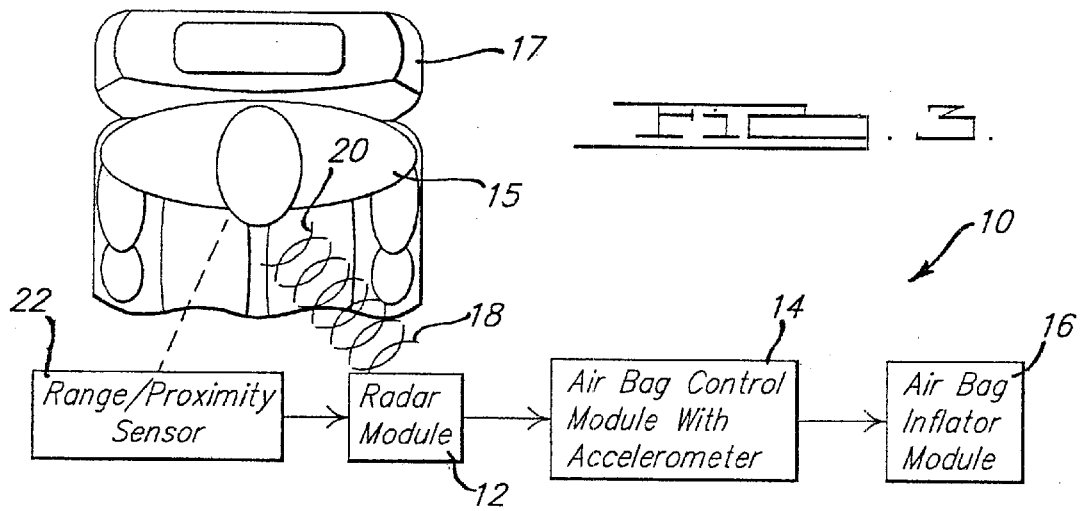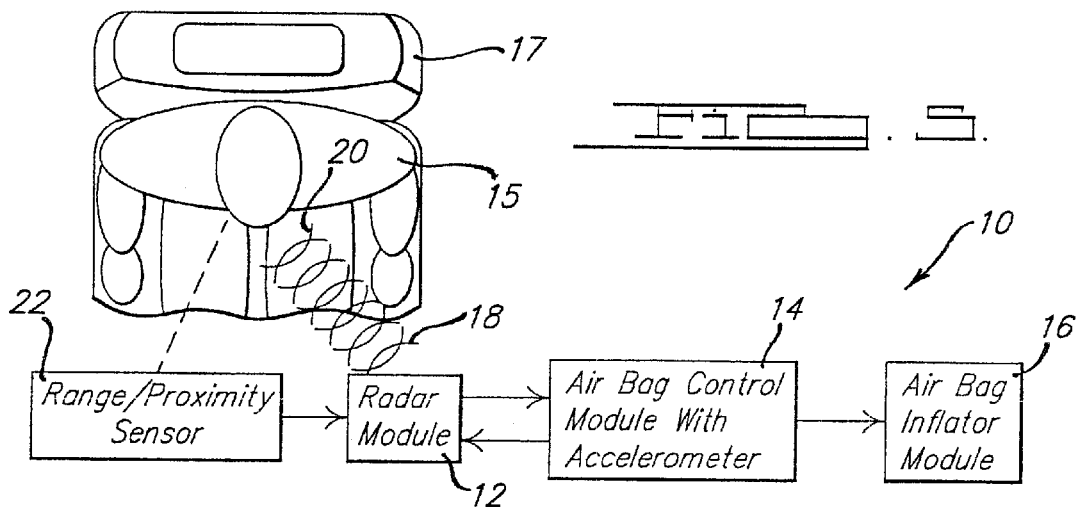

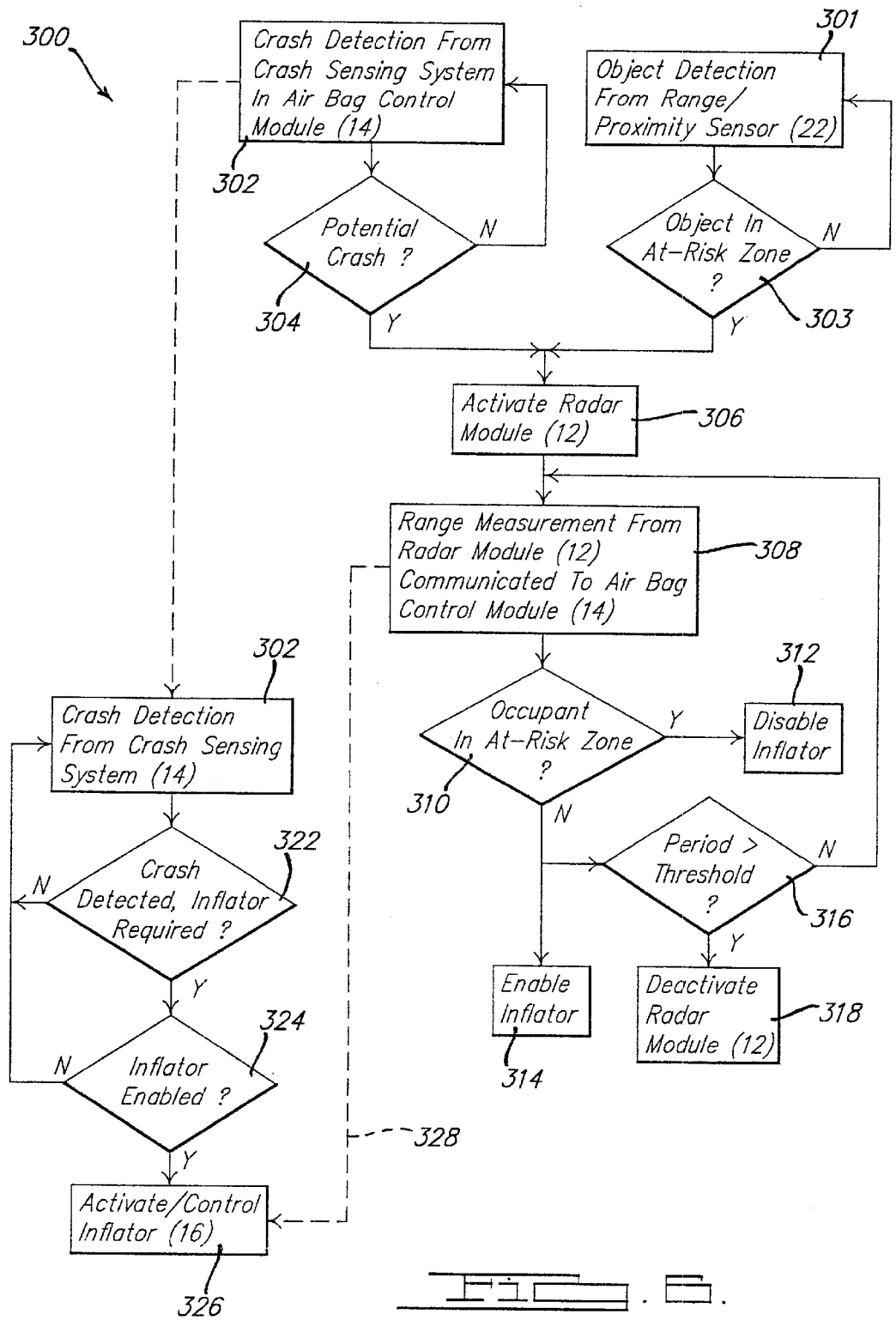

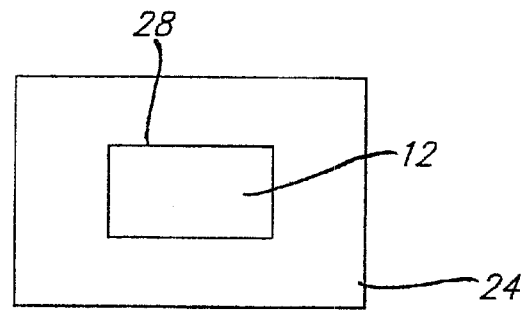
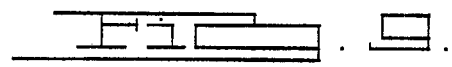
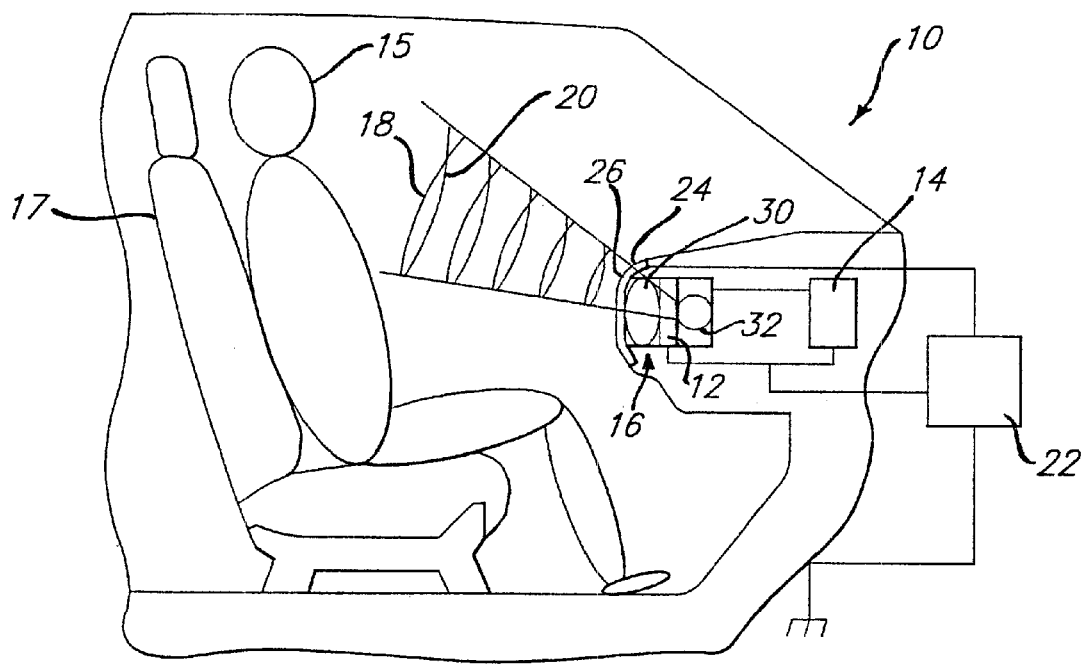
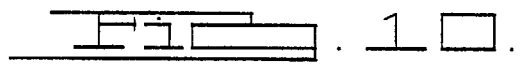

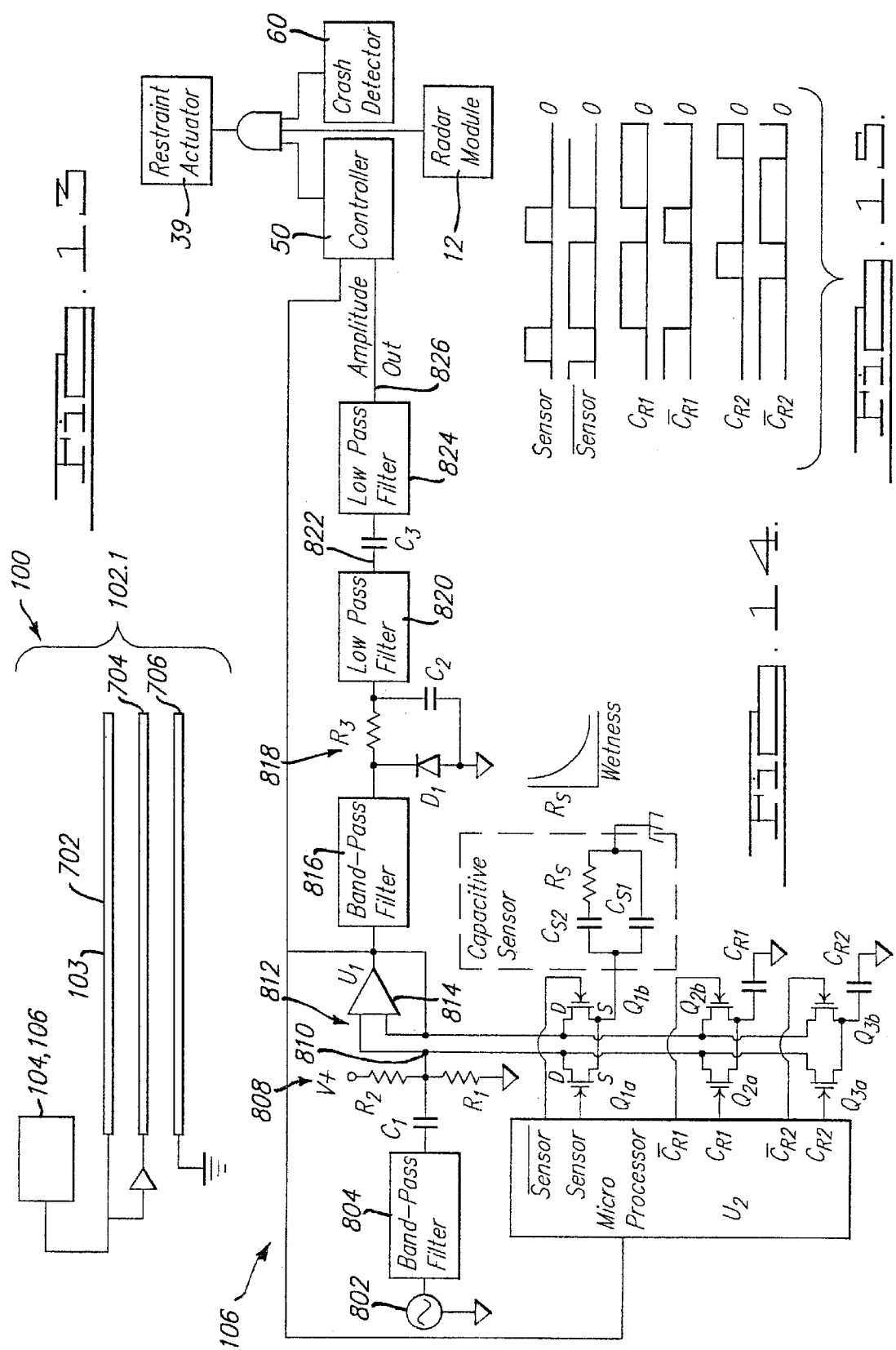

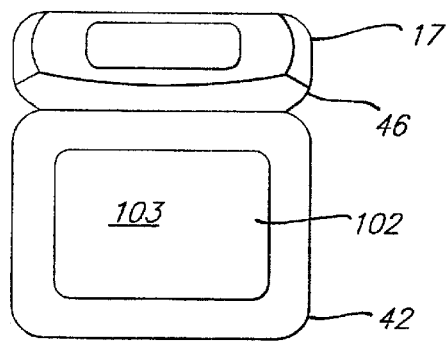
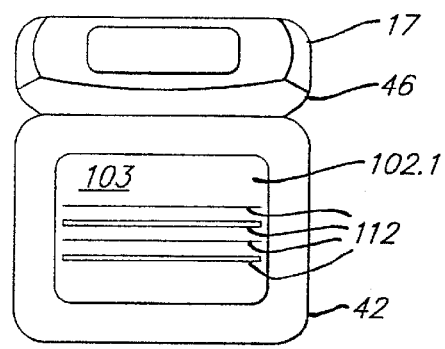
FIG.16a.  FIG.16b.
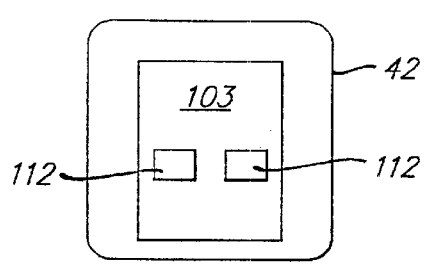
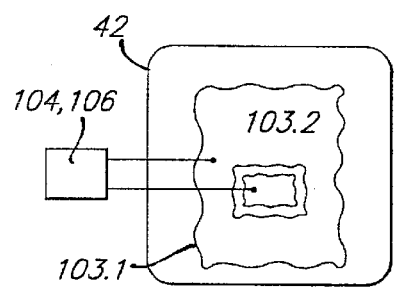
FIG.17.  FIG.18.

OCCUPANT DETECTION SYSTEM

CROSS-REFERENCE TO RELATED APPLICATIONS

This instant application claims the benefit of U.S. Provisional Application Ser. No. 60/209,671 filed on Jun. 6, 2000.

The instant application is a continuation-in-part of the following commonly owned U.S. application: U.S. application Ser. No. 09/294,680 entitled "Occupant Detention System", filed on Apr. 19, 1999 and now U.S. Pat. No. 6,290,255; U.S. application Ser. No. 09/474,473, entitled Occupant Detection System, filed on Dec. 29, 1999 and now U.S. Pat. No. 6,517,106; U.S. application Ser. No. 09/474,673, entitled Occupant Sensor, filed on Dec. 29, 1999 and now U.S. Pat. No. 6,283,504; and pending U.S. application Ser. No. 09/474,470, entitled Occupant Detection System, filed on Dec. 29, 1999.

The following, commonly owned U.S. application also disclose occupant detection systems or occupant sensors: U.S. application Ser. No. 09/294,675 entitled Occupant Detection System, filed on Apr. 19, 1999 claiming benefit of U.S. Provisional Application Serial No. 60/082,523 filed on Apr. 21, 1998, and claiming benefit of U.S. Provisional Application Serial No. 60/119,694 filed on Feb. 11, 1999; U.S. application Ser. No. 09/474,600, entitled Occupant Detection System, filed on Dec. 29, 1999; U.S. application Ser. No. 09/474,469, entitled Occupant Sensor, filed on Dec. 29, 1999; U.S. application Ser. No. 09/568,596 entitled "Occupant Detection System", filed on May 10, 2000; U.S. application Ser. No. 09/614,086 entitled Occupant Sensor, filed on Jul. 11, 2000; U.S. application Ser. No. 09/520,866 entitled Proximity Sensor, filed on Mar. 6, 2000; and U.S. application Ser. No. 09/616,406, entitled Proximity Sensor, filed on Jul. 14, 2000.

The above-entitled applications are incorporated herein by reference.

TECHNICAL ART

The instant invention generally relates to occupant detection systems for controlling the activation of vehicular safety restraint systems and more particularly for determining the presence and position of an occupant for purposes of influencing the deployment of safety restrain system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, deployable roll bars, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bags can be beneficial to any forward facing occupant when that occupant is a significant distance from the inflator door. Air bags, however, can be lethal to infants in rear facing infant seats (RFIS). Air bags can also be hazardous to forward facing occupants if they are too close to the inflator at the time of air bag deployment, such as when an unbelted occupant is subjected to severe pre-impact braking. Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants; to small or frail occupants such as children, small women, or elderly occupants; or to infants in rear facing infant seats (RFIS). While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Automotive manufacturers and NHTSA are searching for methods to disable air bags in situations where they may cause more harm than good. Airbags have been developed to open with enough force to restrain a 175 lb. adult in a high velocity crash. When these air bags are deployed on children in the front passenger seat of a vehicle, they may cause serious injuries. Another potentially harmful situation is when the occupant is very close to the air bag inflator module at the time of air bag deployment. Recent NHTSA data suggests that severe injuries due to this close proximity with the inflator can be reduced or eliminated if the air bag is disabled when the occupant is closer than approximately four to ten inches from the inflator door. The region proximate to air bag inflator where the occupant could be at risk of injury from the air bag is called the "at-risk" zone. The size of the at-risk zone is dependent upon the inflation characteristics of the associated air bag inflator and the velocity of the occupant with respect to the air bag module. Previous studies had suggested that the at-risk zone extended out 4 to 10 inches from the inflator door, depending on the inflation module and the occupant size.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated at-risk zone of the inflator. Recent NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires a occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant scenarios and conditions.

The prior art teaches the use of sensors incorporated into the seat to detect the presence, weight, or seating position of the occupant. U.S. Pat. Nos. 3,672,699, 3,767,002, 5,161, 820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. 5,074,583 teaches a plurality of sensors incorporated into the seat to detect occupant weight and seating position for purposes of controlling an air bag system. U.S. Pat. Nos. 5,232,243, 5,494,311, and 5,624, 132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system. U.S. Pat. Nos. 5,653,462 and 5,829,782 teach system for identifying and monitoring the contents of a passenger compartment by illuminating an object with a wave generator that directs waves towards the vehicle seat, and processing the received signal with a neural network or other pattern recognition system. Furthermore, U.S. Pat. No. 5,653,462 illustrates a system wherein the wave signal is first reflected off the windshield before reaching the vehicle seat.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,322 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacitance responsive control circuit for detecting transient capacitive changes related to the presence of a person. U.S. Pat. Nos. 4,9870,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes. U.S. Pat. No. 5,166,679 teaches a capacitive proximity sensor with a reflector driven at the same voltage as the sensing element to modify the sensing characteristic of the sensor. U.S. Pat. No. 5,770,997 teaches a capacitive vehicle occupant position sensing system wherein the sensor generates a reflected electric field for generating an output signal indicative of the presence of an object. U.S. Pat. Nos. 3,943,376, 3,898,472, 5,722,686, and 5,724,024 also teach capacitive-based systems for sensing occupants in motor vehicles.

The prior art teaches systems—used alone or in combination—for suppressing the passenger air bag in dangerous situations. These systems incorporate various sensing technologies, for example: active infra-red sensors; passive infra-red sensors (heat detectors); ultrasonic sensors; capacitive sensors; weight sensors (including various sensor technologies and measurement methods); child seat "tag" sensors; and vision-based systems.

An objective of these sensors is to determine when an occupant is very close to the inflator door and in the path of the deploying air bag, particularly out-of-position occupants and rear facing infants. Once detected, these systems need to employ the correct airbag deployment strategy such that the passenger side airbag is disabled when a rear facing infant seat is present, or when a person is within a specified region near the inflator door at the time a crash occurs. A complicating situation for the sensor is when there is an object, but no part of the occupant in the at-risk zone. Usually the air bag could still be beneficial for the occupant, especially if the object in the at-risk zone is a low density or low mass object like a newspaper or a map. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Radar systems can be used to measure the range to an object; however, there is a perception that biological tissue may be adversely affected by the continuous exposure thereof to a radar beam. Notwithstanding that there is presently no evidence that a low power radar would have any biological effect, the perception issue is real, and accordingly it may be objectionable to have the radar continuously radiating within the interior of a vehicle interior. Usually two or more of these sensors are used together in an attempt to identify child seats, small occupants, empty seats, large occupants and out-of-position occupants. The more sensors that are used, the better the chance for a high performance system. The costs of systems that use many sensors, however, can become prohibitively high because of the large number of components and the increased assembly complexity of the vehicle.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic-based sensors would require a significant amount of hardware proximate the inflator door if the at-risk zone proximate the inflator is to be monitored.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Some prior-art occupant detection systems attempt to identify the type of occupant or object in the passenger side seat, for example to discriminate a rear facing infant seat from a normally seated adult in the passenger seat. However, this is generally a very challenging task as there are a large variety of possible situations. Sensor systems that depend upon distance measurements to identify occupant situations generally use information from a relatively small number of points in space for identifying the particular type of occupant in the seat from amongst many possibilities. Results from these systems can be unreliable because a particular situation can be significantly changed by simple and common acts such as tossing a blanket over the occupant. Systems that can distinguish the occupant situation may be limited by the inability to disable the air bag during a pre-impact braking event. Moreover, the algorithms used in those systems are sometimes so complex that performance is sometimes unpredictable. While complex algorithms can sometimes makeup for the lack of direct sensory information, the same algorithms can sometimes create performance anomalies.

SUMMARY OF THE INVENTION

The instant invention overcomes the above-noted problems by providing a radar-based range finding system, the activation of which is responsive to a continuously active activation sensor, to suppress an air bag if an occupant is too close to the air bag inflator door after a vehicle crash has started. The continuously active activation sensor comprises either a crash sensor or a range/proximity occupant sensor, and the radar-based range finding system is in communication therewith. The instant invention detects a human body part that is within the at-risk zone of the air bag inflator at the time of impact such that the air bag can be disabled or its inflation rate can be reduced.

Air bags can be hazardous to forward facing occupants that are too close to the air bag inflator at the time of vehicle impact, as for example can occur when an unbelted occupant is exposed to severe pre-impact braking. To be effective, the sensor should detect the presence of the passenger near the air bag inflator within sufficient time so as to disable the air bag while the passenger is still "flying" through the air during this pre-impact braking event.

The radar sensor incorporated in the instant invention is fast enough to identify an occupant's position within several milliseconds. However, one disadvantage of a radar sensor to which occupants are exposed is the potential detrimental effects—either real or perceived—from exposure to the associated electromagnetic radiation. Consumers, and therefore automobile manufacturers, may hesitate to use a radar inside an automobile because of the perception of possible negative health effects, notwithstanding the lack of evidence that a low power radar would have any biological effect.

Accordingly, one object of the instant invention is to provide an improved occupant detection system, which when incorporated into an occupant restraint system, reduces the risk of injury to occupants by the associated air bag module.

A further object of the instant invention is to provide an improved occupant detection system that minimizes the exposure of an occupant to RF radiation.

A further object of the instant invention is to provide an improved occupant detection system that can determine if an occupant is positioned within the at-risk zone of the air bag module.

The instant invention provides for several methods and apparatus that could be used alone or together to allow the radar to be inactive until an object is in the at-risk zone or a vehicle is actually in a collision. The instant invention provides for fast communications and an activation feature that keeps the radar off until a signal from the crash sensing air bag control module is received, or until a range/proximity sensor detects an object in the at-risk zone. Upon activation of the radar incorporated in the instant invention, the system provides for disabling the air bag if the occupant is within the at-risk zone in front of the air bag inflator.

In accordance with another aspect, the radar doesn't need to be active until an occupant—that when seated in a normal seating position in the passenger seat would require the deployment of an air bag responsive to a crash—is not seated in a normal seating position. A second occupant sensor, responsive to whether an occupant is in a normal seating position, also controls the activation of a radar for measuring occupant position, so that the radar is enabled to radiate energy only when the occupant is not in a position for which an air bag would be enabled. Stated in another way, the radar is prevented from radiating electromagnetic energy at a normally seated occupant detected by the second occupant sensor. The second occupant sensor identifies if an occupant is seated normally and thereby "in-position" for a safe deployment of the air bag. If so, the radar is disabled. Otherwise, if an occupant is present, the radar is enabled.

In accordance with yet another aspect, when the second occupant sensor—adapted to detect a child seat or other "static" situation that may require that the air bag be disabled—detects a child seat, or any other "static" situation that may require that the air bag be disabled, the radar remains inactive and the airbag is suppressed. When the occupant is identified as being a normally seated occupant properly positioned to receive an air bag deployment, the radar is disabled and the air bag is enabled. The radar only becomes active when the normally seated occupant is no longer identified by the second occupant sensor as being properly positioned, i.e. "in-position". The radar is then used to identify whether the occupant is actually "out-of-position" by sensing the at-risk region proximate to the air bag inflator module. Accordingly, most of the time the radar is off, thereby mitigating any real or perceived biological effects of the radar, but becomes activated, for example, when the occupant's head or torso could be within the at-risk zone of the air bag inflation module. Moreover, this activation of the radar can be further limited to only when a crash sensor detects the potential for a crash of sufficient magnitude to possibly cause the deployment of the air bag inflator module.

The instant invention provides a number of associated advantages, including the following:

1. A radar can penetrate many materials. The depth of penetration depends on the material and the frequency of the radar.
2. The radar may sense a newspaper, but it can also sense objects beyond the newspaper.
3. The radar depends on the speed of light which does not vary significantly over automotive environments.
4. The radar is sufficiently fast to enable the control of a safety restraint system, because the associated range measuring process occurs at the speed of light, and the range data can be sampled at relatively high frequencies.
5. There are no moving parts in a radar.
6. The mechanism used in the radar is not sensitive to mechanical alignments, as are optical range finding systems that are calibrated based upon the mechanical position of associated imaging optics.
7. The radar can be hidden behind the trim pieces since it can transmit through thin sheets of plastic.
8. In one embodiment, because the activation of the radar is responsive to the crash in accordance with a communications path between the radar module and the frontal crash sensing unit, the radar remains inactive until a crash actually starts. Accordingly, there should be no threat, real or even perceived, of any biological effects due to the radar because the radar is inactive most of the time. For example, when activated responsive to a crash sensor, the radar doesn't run until a crash actually begins. When it does run, the power density of the RF energy is well below conservative industry or government power density limits. The vehicle acceleration information can also be obtained by the radar module by using an on-board accelerometer, but preferably this information is relayed by high speed communications between the radar and the air bag control module, wherein the air bag control module controls when the air bags are deployed and accordingly knows when the occupant position measurement from the radar module is needed.
9. In another embodiment, the instant invention also provides for the combination of sensors to make an assessment of whether there is an occupant in the at-risk zone near the inflation module. A range/proximity sensor using ultrasonic, active IR, passive IR, capacitive sensing, vision, or inductive sensing technologies is used to constantly monitor the at-risk zone. When an object is detected within the at-risk zone by the range/proximity sensor, the radar is turned on to determine the type of object, for example such as a person, or a person holding a newspaper or map. The radar remains inactive until there is a possibility of the air bag inflator module deploying when there is an occupant in an at-risk zone of the air bag inflator module, and when activated, the radar detects the position of the occupant, and the actuation of the air bag inflator module is controlled responsive thereto.
10. The use of a radar along with a capacitive or inductive sensing technologies allows the system to robustly distinguish between newspapers and occupants in the at-risk zone.
11. In another aspect, the instant invention provides for controlling the air bag inflator module at least partially responsive to a second occupant sensor, wherein the radar remains inactive under conditions for which the second occupant sensor determines that either the air bag inflator module should be either disabled or enabled, and is activated when the second occupant sensor detects 1) an occupant that might require actuation of an air bag inflator module responsive to a crash, and 2) that the occupant is not normally seated so as to be at risk of injury by the deployment of the air bag inflator module. Accordingly, the second occupant sensor provides for further reducing the occupant's cumulative exposure to the radar.

These and other objects, features, and advantages of the instant invention will be more fully understood after reading the following detailed description of the preferred embodiment with reference to the accompanying drawings and viewed in accordance with the appended claims.

BRIEF DESCRIPTION OF THE DRAWINGS

FIG. 1 illustrates a block diagram of the instant invention in accordance with a first embodiment;

FIG. 3 illustrates a block diagram of the instant invention in accordance with a second embodiment;

FIG. 5 illustrates a block diagram of the instant invention in accordance with a third embodiment;

FIG. 6 illustrates a block diagram of occupant detection system logic in accordance with the third embodiment;

FIG. 9 illustrates an electrode of a range/proximity sensor in accordance with the arrangement illustrated in FIG. 8;

FIG. 10 illustrates the instant invention in accordance with a third arrangement of the associated sensor elements;

FIG. 13 illustrates a cross section of one embodiment of an electric field sensor;

FIG. 14 illustrates an example of a sensing circuit for an electric field sensor accordance with the instant invention;

FIG. 15 illustrates the operation of various elements of the sensing circuit of FIG. 14.;

FIG. 16*a* and FIG. 16*b* illustrate various capacitive sensor pads in accordance with an embodiment of the instant invention;

FIG. 17 illustrates an alternate capacitive sensor pad in accordance with another embodiment of the instant invention;

FIG. 18 illustrates a capacitive sensor comprising a plurality of electrodes.

DETAILED DESCRIPTION OF THE PREFERRED EMBODIMENT(S)

Figure 2:
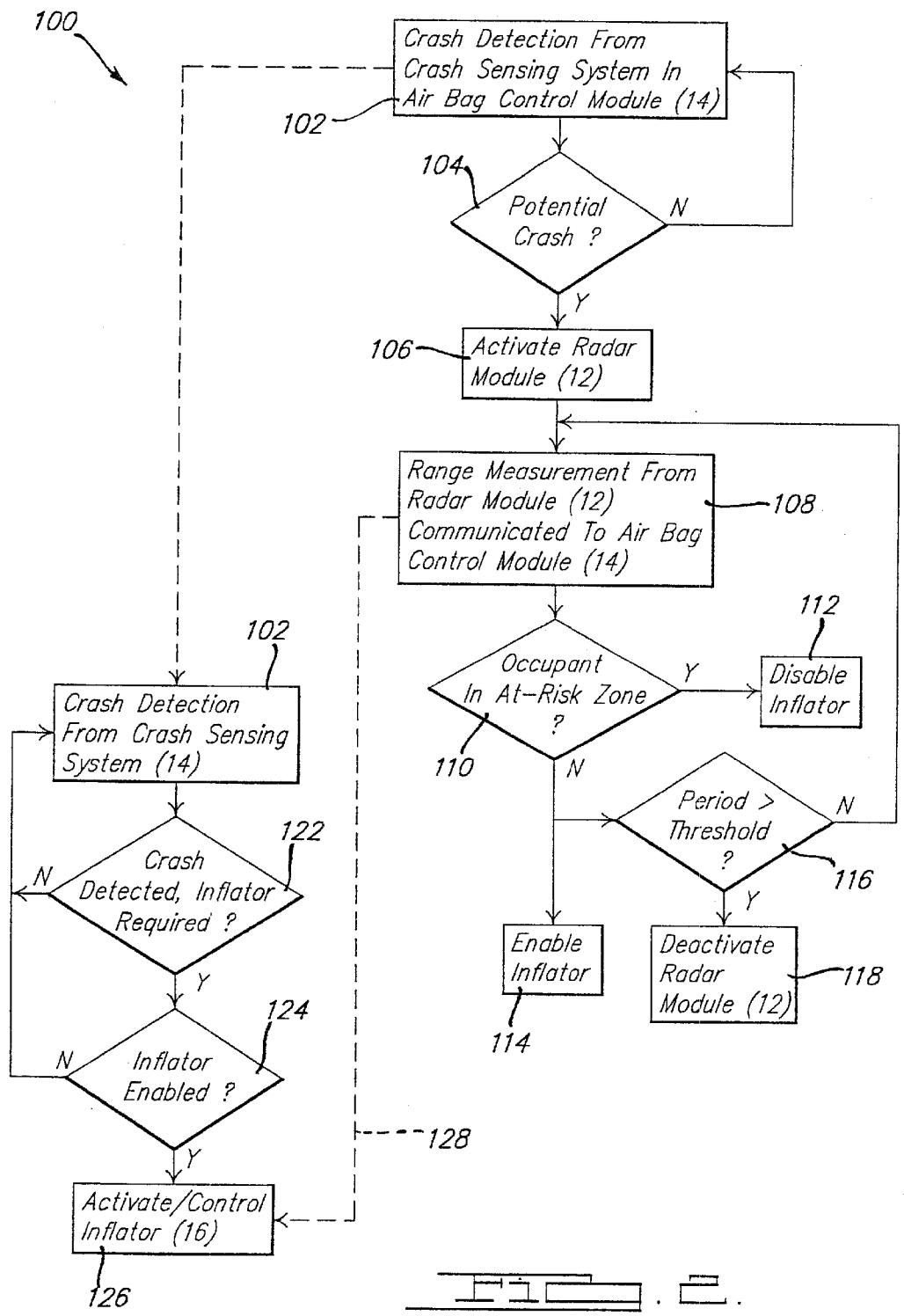
FIG. 2 illustrates a block diagram of occupant detection system logic in accordance with the first embodiment.

Referring to FIG. 1, an occupant detection system 10 comprises a radar module 12 that can scan a distance range between 0 and, for example, approximately 1 meter in approximately 5 milliseconds or less. The radar module 12 preferably operates at a frequency that allows it to penetrate a newspaper while still using a low average power, for example between 1 GHz and 100 GHz. The lower frequencies in that range can be beneficial because they transmit through thick newspapers more efficiently than the higher frequencies. Moreover, when the radar module 12 is located so as to transmit through a dielectric media, for example though plastic materials of an air bag door or instrument panel, then the operating frequency is adapted so that the radar energy propagates through the dielectric media. Low cost, short pulse radar systems, also known as "wide band" or "ultra wide band" radars, are other examples of radars that are suitable for use as a radar module 12. An algorithm is provided for determining from the radar scan whether a human body part is near the air bag inflator module 16. This includes the ability to differentiate an object such as a newspaper from the occupant's body so that the air bag is not disabled by an object such as a newspaper being in the at-risk zone. The radar module 12 measures the distance to an occupant 15 by any one of a number of known techniques including time of flight; phase shift; or frequency shift, as in linear frequency modulate continuous wave (LFMCW) radar; using either pulsed or continuous wave electromagnetic radiation wherein transmitted waves 18 from the radar module 12 are reflected by a reflective surface and returned as reflected waves 20 to the radar module.

The radar module 12 is, for example, mounted in the vehicle 21 such that it can sense objects in the deployment path of the air bag inflator module 16, and sense the occupant, or other surface, a significant distance beyond the at-risk zone region proximate to the air bag inflator. The radar module 12 can, for example, be integrated into the air bag door during the manufacturing/molding thereof, or after the door has been molded, by potting the circuit board of the radar module 12 onto the inside surface of the door of the air bag inflator module 16, or onto the backside of other interior dashboard pieces. This "under-the-skin" mounting is advantageous because it minimizes the possibility that the radar will sense the movement of part of the air bag inflator module 16 or dashboard responsive to the high acceleration following impact.

The occupant detection system 10 further comprises an activation sensor for controlling the activation of the radar module 12 responsive to the likelihood of the vehicle 21 being in a crash, or to an occupant being positioned so as to be at risk of injury from a deploying air bag.

In accordance with a first embodiment of the instant invention, a dedicated high speed communications link is established between the radar module 12 and the control module 14. Upon sensing a high acceleration in the frontal direction (typically around 1 g or above), the control module 14 recognizes the possibility of the vehicle 21 being in a crash and communicates this to the radar module 12. For example, if the vehicle acceleration exceeds a threshold, as for example might be detected by a crash safing sensor, then the radar module 12 is activated. The high speed communications link may be either a direct connection, for example using wire or fiber optic cable; or a wireless connection, for example using radio frequency or optical beam electromagnetic radiation. Once the radar module 12 makes the determination of occupant position, and the radar module 12 identifies that the occupant 15 is positioned so as to not be in danger of injury from the air bag inflator module 16, the radar module 12 communicates an enable signal to the control module 14. The communications should be immune to electromagnetic interference and fast enough to allow changes of state in well under 1 millisecond. The air bag inflator module is disabled either if the radar module 12 detects the vehicle seat 17 as the closest object—thereby assuming the seat to be empty—or if the radar module 12 detects an occupant 15 within the at-risk zone of the air bag inflator module 16. There are many possible communications schemes.

The occupant detection system 10 may further comprise a range/proximity sensor 22 that determines if the occupant is within a predetermined at-risk zone proximate to the air bag inflator module 16. The range/proximity sensor 22 uses capacitive, ultrasonic, optical (including active or passive infrared, or vision based systems), inductive or radar technologies. The radar module 12 is mounted in the vehicle 21 such that it can sense objects in front of the air bag inflator module 16 and sense the occupant or other surfaces a significant distance beyond the at-risk zone region in front of the air bag inflator module 16. The range/proximity sensor 22 is also be mounted such that it can sense objects in front of the air bag inflator module 16. An object in the at-risk zone region in front of the air bag inflator module 16 would be sensed by both the radar module 12 and the range/proximity sensor 22.

The radar module 12 when activated senses the region in front of the air bag inflator module 16. A fast two-way communications link is provided between the radar module 12 and the control module 14. The control module 14 incorporates an on-board accelerometer to determine when the vehicle 21 is in a crash, and communicates the occurrence of a crash to the radar module 12 using the two-way communications link.

The control module 14 senses the acceleration of the vehicle 21 in the forward direction. In even the highest speed frontal crashes that require the air bag, there is always a time period between the "first hint of a crash" from the control module accelerometer and the air bag's required "time to fire." The first hint of a crash is when the accelerometer sees an acceleration level not seen during non-crash driving, possibly 1 to 3 g. This time period is used by the control module algorithm to determine if the crash is severe enough to require an air bag, and is referred to hereinafter as the "minimum pre-crash interval". The minimum delay ("time to fire") is dependent on the vehicle 21 and air bag inflator module 16 design and is usually greater than about 8 milliseconds. During the minimum pre-crash interval, the radar module 12 can be activated and make a determination if the occupant is within the air bag module's at-risk zone.

Referring to FIG. 2, the associated system logic (100) is as follows:

a. If in step (104) from step (102) there is no hint of a crash from the control module 14, then the radar module 12 remains inactive.

b. If in step (104) there is a hint of a crash, then in step (106) the control module 14 communicates this to the radar module 12, causing the radar to be activated so as to determine in step (108) if there is an occupant in the at-risk zone of the air bag inflator module 16 and communicate this information to the control module 14 within the minimum pre-crash interval.

i) If in step (110) there is an occupant in the at-risk zone, then the radar module 12 communicates this to the control module 14, causing the control module 14 to be disabled in step (112).

ii) If in step (110) there is no occupant in the at-risk zone, the radar module 12 communicates this to the control module 14, so as to enable the control module 14 in step (114), and continues in step (116) to look for an occupant in the at-risk zone for an extended period of time, possibly several seconds. If during this extended monitoring time period, the radar module 12 senses an occupant in the at-risk zone, this information is communicated to the control module 14, causing the control module 14 to be disabled in step (112). Otherwise, after the extended period of time, the radar module 12 is deactivated in step (118).

c. If in step (122) from step (102) the crash sensing system in the control module 14 detects a crash for which an air bag inflator is required, and if in step (124) the control module 14 is enabled, then in step (126) the control module 14 is activated, possibly responsive (128) to the range measurement form the radar module 12.

Referring to FIG. 3 illustrating a second embodiment of the instant invention, when activated, the radar module 12 senses a region proximate to the air bag inflator module 16 with a range/proximity sensor 22 as described hereinabove.

The two sensors are used together to accurately determine if any occupant is in the at-risk zone of the air bag inflator. The radar module 12 remains inactive until an object is sensed by the range/proximity sensor 22, after which the radar module 12 becomes active and determines if the object in the at-risk zone is part of an occupant.

Figure 4:
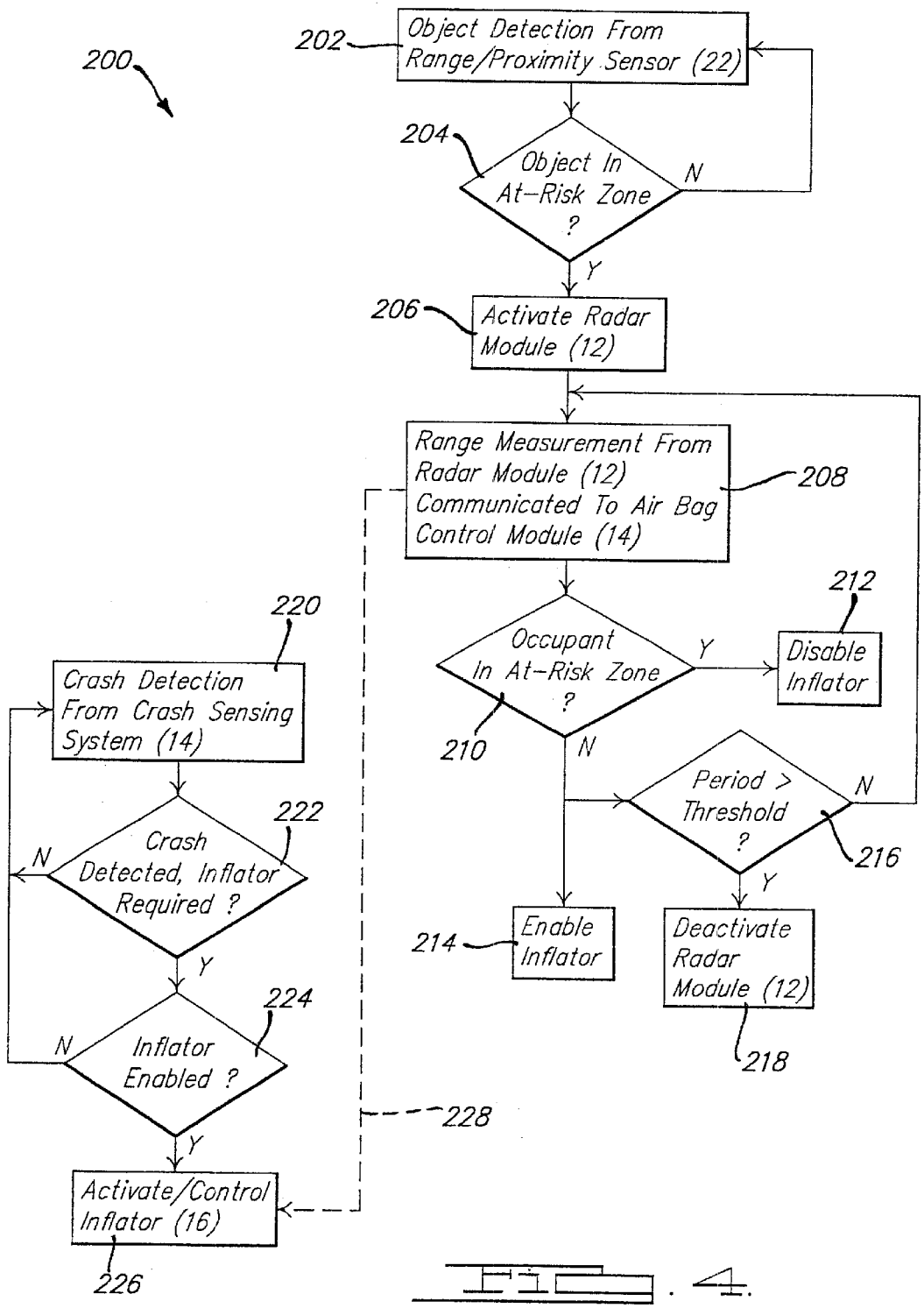
FIG. 4 illustrates a block diagram of occupant detection system logic in accordance with the second embodiment.

Referring to FIG. 4, the associated system logic (200) is as follows:

a. If in step (204) from step (202) the range/proximity sensor 22 does not sense an object in the at-risk zone of the air bag inflator module 16, then the radar module 12 remains inactive.

b. If in step (204) the range/proximity sensor 22 senses an object in the at-risk zone of the air bag inflator module 16, then in step (206) the radar module 12 is activated so as to determine in step (208) if there is an occupant in the at-risk zone of the air bag inflator module 16.
  i) If in step (210) there is an occupant in the at-risk zone, then the radar module 12 communicates this to the control module 14, causing the control module 14 to be disabled in step (212).
  ii) If in step (210) there is no occupant in the at-risk zone, the radar module 12 communicates this to the control module 14 in step (214), and continues in step (216) to look for an occupant in the at-risk zone for an extended period of time, possibly several seconds. If during this extended monitoring time period, the radar module 12 senses an occupant in the at-risk zone, this information is communicated to the control module 14, causing the control module 14 to be disabled in step (212). Otherwise, after the extended period of time, the radar module 12 is deactivated in step (218).

c. If in step (222) from step (220) the crash sensing system in the control module 14 detects a crash for which an air bag inflator is required, and if in step (224) the control module 14 is enabled, then in step (226) the control module 14 is activated, possibly responsive (228) to the range measurement form the radar module 12.

In accordance with another arrangement of the activation sensor, the radar module 12 may incorporate an accelerometer that detects the possibility of an air bag deployment, however this arrangement is less preferable because of a potential time delay between the high accelerations sensed at the control module 14 and those at the radar module 12.

Referring to FIG. 5 illustrating a third embodiment of the instant invention that is essentially a combination of the first two embodiments, the radar module 12 is inactive until the control module 14 detects a hint of a crash or the range/proximity sensor 22 senses an object in the at-risk zone of the air bag inflator module 16. When activated, the radar module 12 senses the region proximate to the air bag inflator module 16.

The two sensors are used together to accurately determine if any occupant is in the at-risk zone of the air bag inflator module 16. If an object is sensed by the range/proximity sensor 22, the radar module 12 is activated and determines if the object in the at-risk zone is part of an occupant.

A fast two-way communications link is provided between the radar module 12 and the control module 14. The control module 14 incorporates an on-board accelerometer to determine when the vehicle 21 is in a crash, and communicates the occurrence of a crash to the radar module 12 using the two-way communications link.

Referring to FIG. 6, the associated system logic (300) is as follows:

a. If in step (303) from step (301) the range/proximity sensor 22 does not sense an object in the at-risk zone of the air bag inflator module 16, and if in step (304) from step (302) there is no hint of a crash from the control module 14, then the radar module 12 remains inactive.

b. If in step (303) the range/proximity sensor 22 senses an object in the at-risk zone of the air bag inflator module 16, or if in step (304) there is a likelihood of a crash, then in step (306) the radar module 12 is activated so as to determine if there is an occupant in the at-risk zone of the air bag inflator module 16.
  i) If in step (310) from step (308) there is an occupant in the at-risk zone, then the radar module 12 communicates this to the control module 14, causing the control module 14 to be disabled in step (312).
  ii) If in step (310) there is no occupant in the at-risk zone, the radar module 12 communicates this to the control module 14 in step (314), and continues in step (316) to look for an occupant in the at-risk zone for an extended period of time, possibly several seconds. If during this extended monitoring time period, the radar module 12 senses an occupant in the at-risk zone, this information is communicated to the control module 14, causing the control module 14 to be disabled in step (312). Otherwise, after the extended period of time, the radar module 12 is deactivated in step (318).

d. If in step (322) from step (302) the crash sensing system in the control module 14 detects a crash for which an air bag inflator is required, and if in step (324) the control module 14 is enabled, then in step (326) the control module 14 is activated, possibly responsive (328) to the range measurement from the radar module 12.

In accordance with the second and third embodiments, the range/proximity sensor 22 is used to trigger the radar module 12 when there is an object detected in the at-risk zone. In order for this to be effective, the range/proximity sensor 22 should be sufficiently fast so the delay between the time the object penetrates the at-risk zone and the time the radar module 12 is activated is sufficiently small (preferably less than 2 milliseconds.) Active IR sensors that use the position of an imaged spot of light can be sufficiently fast because the actual position of the spot is effectively updated in a few nanoseconds. Capacitive sensors can also be sufficiently fast.

Ultrasonic sensors have an inherent delay because the speed of sound is approximately 13 inches per millisecond. If the distance to be measured extends only to about 8 inches, this does not present an unusable delay. If, however, the ultrasonic sensor should wait for the pulse to be reflected from its furthest possible distance, the delay can become over 10 milliseconds. There are several ways to minimize this delay.

One method is to use two ultrasonic transducers. One transducer sends out the ultrasonic beam that is continuously swept in frequency, for example a chirped signal. The second transducer is simply listening for the reflected beam. Every distance will have a known frequency shift between the frequency "currently" being sent out and the frequency "currently" being received. This frequency modulation concept is used in radar systems. Another method is to send out a pulse from a single transducer as soon as the previous pulse is received.

A capacitive sensor has several advantages as the range/proximity sensor 22. The advantages include:

1. Like the radar, the capacitive sensor can also be hidden from the occupant by the plastic on the surface of the instrument panel.
2. The capacitive sensor is relatively immune to sensing newspaper type objects or any objects that are poorly coupled to ground. This characteristic is helpful when condensation or another isolated radar reflector is within the at-risk zone.
3. The capacitive sensor's lack of a highly accurate absolute range measurement and insensitivity to newspapers compliments the radar's ability to measure range and sense a newspaper.
4. One problem with a capacitive sensor is that small changes in the sensor's offset may be large enough to inadvertently indicate that an occupant is at the outer envelope of the capacitive sensor's range. If the radar is activated because of this offset drift, the radar can determine if there is an object within the at-risk zone. If there is no object in the at-risk zone, the capacitive sensor's threshold can be adjusted to a new "no target" level.

The radar module 12 and the range/proximity sensor 22 can be placed in a variety locations in accordance with the various embodiments described hereinabove. In one location, the sensors are mounted on top of, or as close as possible to, the air bag inflator module door. The sensors sense in the direction of the air bag deployment since that is the most dangerous region. The sensors may also be located off to the side of the air bag inflator module 16 and so as to sense across the region in front of the air bag inflator. The sensor beams may also be located so as to cross in front of the air bag inflator parallel to the face of the air bag inflator door.

Figure 7:
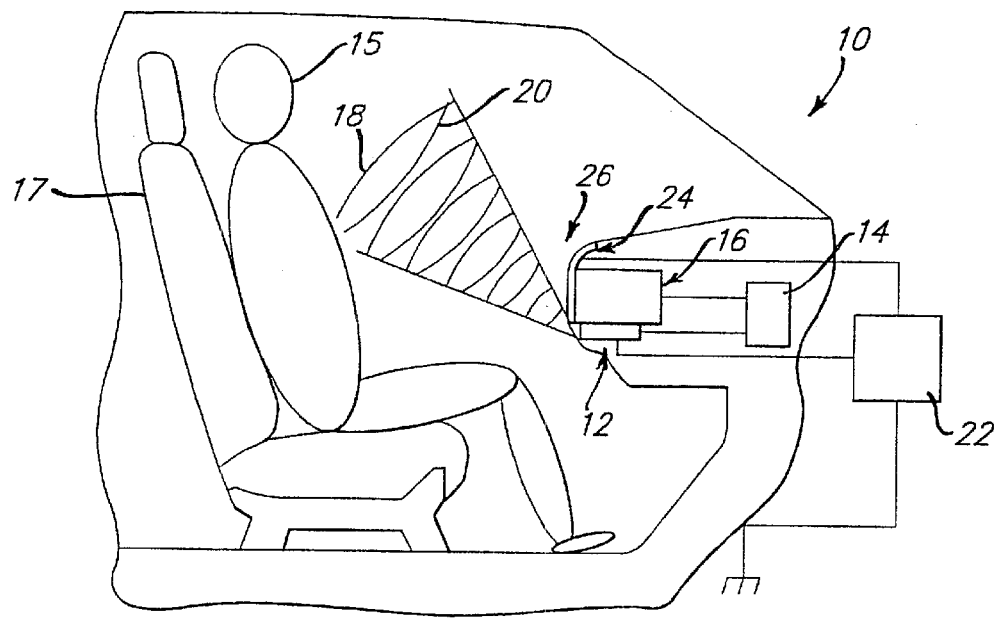
FIG. 7 illustrates the instant invention in accordance with a first arrangement of the associated sensor elements.

Referring to FIG. 7, the radar module 12 is located below the air bag inflator module 16 and observes the occupant 15 through the instrument panel trim. The range/proximity sensor 22 comprises a capacitive sensor with a capacitive sensing electrode 24 incorporated in the door 26 of the air bag inflator module 16.

Figure 8:
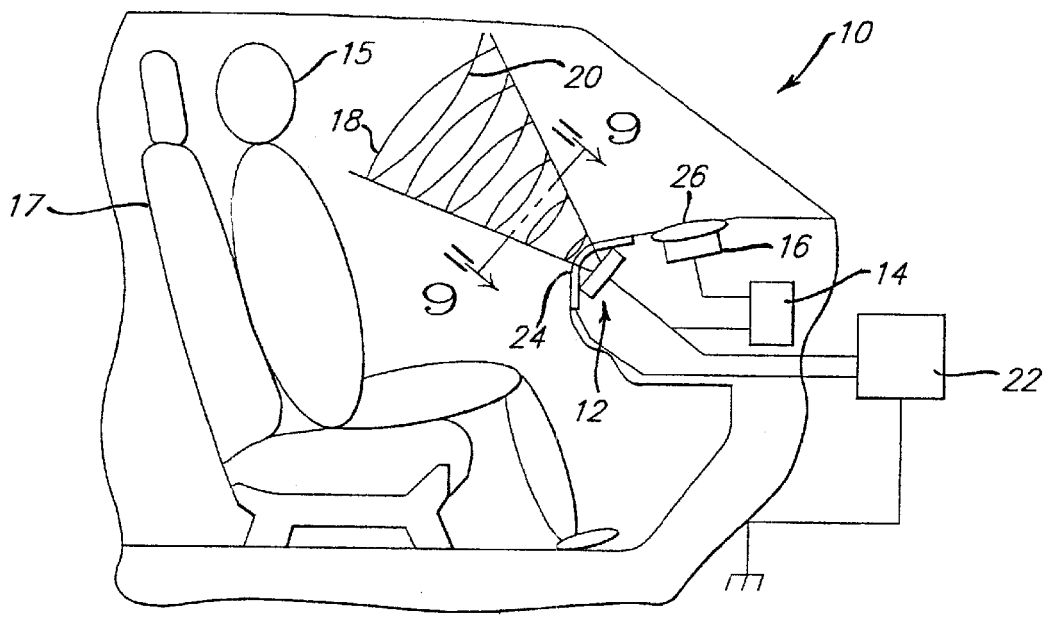
FIG. 8 illustrates the instant invention in accordance with a second arrangement of the associated sensor elements.

Referring to FIGS. 8 and 9, the radar module 12 is at a separate location from the air bag inflator module 16 and observes the occupant 15 through an orifice 28 in a capacitive sensing electrode 24 incorporated in the instrument panel.

Referring to FIG. 10, the radar module 12 is incorporated in the air bag inflator module 16 and observes the occupant 15 through the air bag 30 of the air bag inflator module 16.

The air bag inflator module 16 comprises a gas generator 32 for deploying the air bag 30.

In accordance with another aspect of the instant invention, a second occupant sensor 200 is used to identify the presence of a normally seated occupant for whom the air bag inflator module 16 should be enabled responsive to a crash. For example, in a given crash, if the head and torso of an occupant are sufficiently far from the air bag inflator module 16 so that the occupant is not at a greater risk of an injury by the deployment of the air bag inflator module 16, than without the deployment thereof, then the air bag inflator module 16 should be deployed responsive to that crash. When the second occupant sensor 200 identifies that the occupant is seated normally, the air bag inflator module 16 continues to be enabled and the radar module 12 is not activated to sense other objects in the at-risk zone 204 because responsive to a crash of sufficient severity, a normally seated occupant is assumed to benefit from the actuation of the air bag inflator module 16, regardless of whether or not their hands are located in the at-risk zone 204 of the air bag inflator module 16. Accordingly, by not activating the radar module 12 when a normally seated occupant is detected by the second occupant sensor 200, the air bag inflator module 16 would not then be disabled responsive to the radar module 12 detecting the hands of the occupant in the at-risk zone 204, as could otherwise occur without such a second occupant sensor 200.

Examples of various occupant detection systems and sensors capable, in whole or in part, of discriminating a normally seated occupant from other seat occupancy scenarios are disclosed and claimed in the above-identified patent applications that have been incorporated by reference herein.

Figure 11:
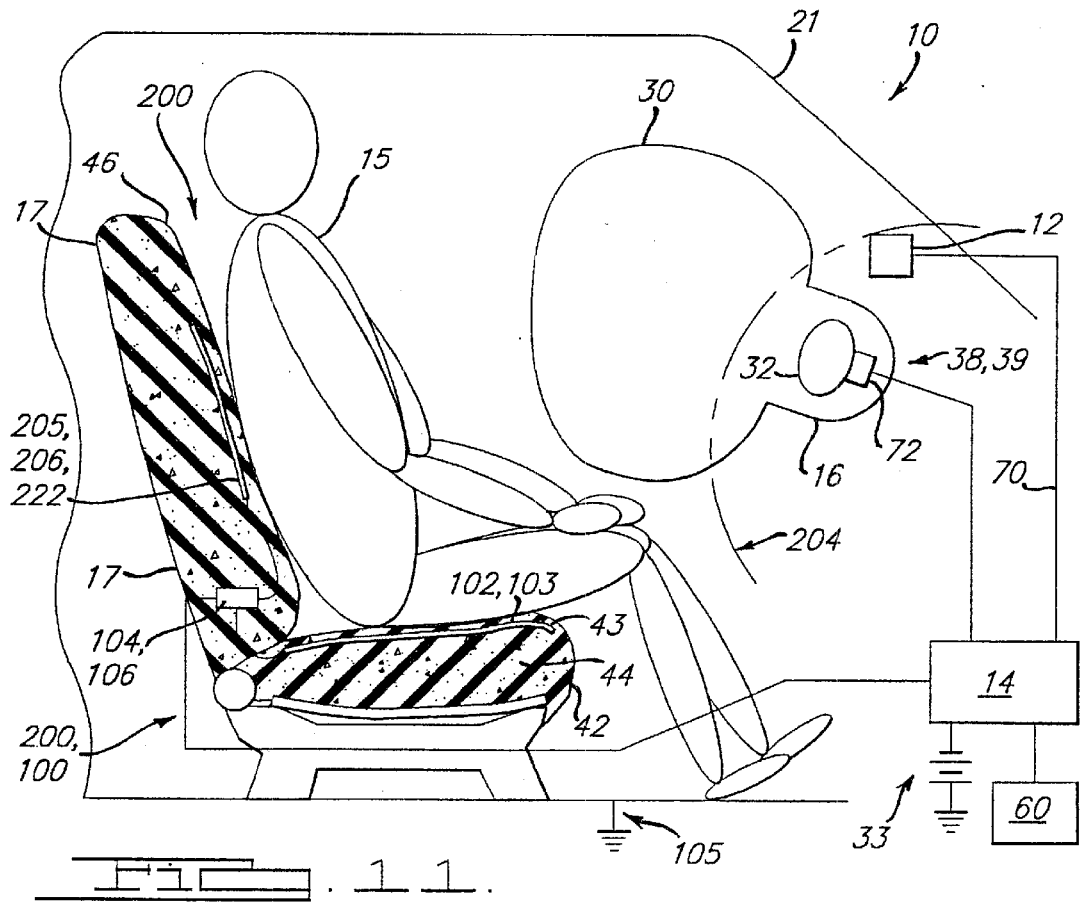
FIG. 11 illustrates another embodiment of the instant invention incorporating one embodiment of a second occupant sensor in accordance with the instant invention.

As an example, referring to FIG. 11, a second occupant sensor 200 may comprise an electric field sensor 100 for identifying whether there is a forward facing occupant on the seat bottom 42 of a vehicle seat 17; and/or a second range/proximity sensor 222 for measuring the proximity of an occupant's torso to the seat back 46 of the vehicle seat 17.

The electric field sensor 100 is placed in the seat bottom 42 under the seat cover 43 and close to the top of the foam cushion 44. Typically, the electric field sensor 100 is located in the seat bottom 42 of the passenger vehicle seat 17, although it may also be located in other seat locations where a child seat might be located that would need to be detected. The electric field sensor 100 comprises for example a capacitive sensing pad 102, comprising at least one electrode 103, connected to an electronics module 104 containing a sensing circuit 106 necessary to make the capacitance measurement, wherein preferably the capacitance of at least one electrode 103 is measured with respect to a circuit ground 105. The electric field sensor 100 is operatively coupled to a control module 14, which controls the actuation of a safety restraint system 38, for example an air bag inflator module 16, responsive to a detected type and seating configuration of an object or occupant 15 on the vehicle seat 17.

The second range/proximity sensor 222 determines if the occupant 15 is within a predetermined range proximate to the seat back 46 of the vehicle seat 17. For example, the second range/proximity sensor 222 comprises a range sensor that measures the distance between the occupant 15 and the seat back 46, either directly or indirectly. The second range/proximity sensor 222 comprises either a range sensor that measures the distance between an object and the seat back 46 of a vehicle seat, for example an active infrared sensor, optical sensor, vision sensor or an ultrasonic ranging sensor, or a proximity sensor that is responsive to the proximity of an object to the seat back of a vehicle seat, for example an electric field sensor, a capacitive sensor as a particular embodiment thereof, or an inductive sensor.

FIG. 11 illustrates a second range/proximity sensor 222 comprising a second electric field sensor 206, e.g. a capacitive sensor. The sensing circuit 106 of the first electric field sensor 100 can be adapted to also make the associated capacitance measurement of the second electric field sensor 206 of the second range/proximity sensor 222. The second electric field sensor 206 of the second range/proximity sensor 222, for example, can be a relatively smaller version of the first electric field sensor 100 in the seat bottom, e.g. using a sensing circuit 106 configured to achieve sensitivity out to about 50 millimeters (2 inches), sensing the area across the seat back located between approximately 250 millimeters (10 inches) and 450 millimeters (18 inches) from the seat bottom 42, corresponding to the area where occupants normally press against the seat back. As so adapted, the second electric field sensor 206 in the seat back 46 can be used to identify when the occupant is within approximately 2 inches of the seat back 46.

If the occupant is seated against the seat back 46, their head and torso are assumed to be outside the at-risk zone 204 of the air bag inflator module 16, so that it would be safe to activate the air bag inflator module 16, so that the radar module 12 need not be activated for detecting the presence of an occupant proximate to the at-risk zone 204 of the air bag inflator module 16.

The scope of the second occupant sensor 200 in accordance with the instant invention is not limited to the above examples or applications that have been incorporated by reference. Other examples of second occupant sensor 200 include capacitive or inductive sensors in the vehicle headliner, ultrasonic sensors in the vehicle headliner or seat back 46, active infrared based ranging sensors near the vehicle headliner or seat back 46, passive infrared sensing from near the headliner, and vision-based sensors with a perspective to view the passenger seat. The second occupant sensor 200 is selected so as to not create a real or perceived risk to the occupant. The second occupant sensor 200 preferably has a sampling period of less than approximately 50 milliseconds, and more preferably less than 10 milliseconds, so as to make it possible for the radar module 12 to begin detecting the occupant position before the occupant 15 reaches the at-risk zone 204.

Stated in another way, the second occupant sensor 200 is a form of activation sensor that causes the radar module 12 to be activated if an occupant 15 is detected as not being in a normal seating position. The second occupant sensor 200 is used to trigger the radar module 12 to begin scanning to determine if an occupant 15 is either moving towards or in the at-risk zone 204 of the air bag inflator module 16.

In operation, an occupant 15 seated on the seat bottom 42 of vehicle seat 17 sufficiently increases the capacitance of the electric field sensor 100 sensed by the sensing circuit 106 so as to indicate to the control module 14 that an occupant 15 is seated proximate thereto. The second range/proximity sensor 222 determines if the torso of the occupant 15 is located proximate to the seat back 46. The signals from the electric field sensor 100 and the second range/proximity sensor 222 are operatively coupled to the control module 14 which operates in accordance with known analog, digital, or microprocessor circuitry and software. A crash sensor 60 and the radar module 12 are also operatively coupled to the control module 14.

If the second range/proximity sensor 222 detects an occupant 15 seated on the vehicle seat 17 with their torso proximate to the seat back 46, then the control module 14 both disables the radar module 12—so as to not unnecessarily irradiate the occupant 15 with associated electromagnetic radiation—and enables the actuation of the air bag inflator module 16 responsive to the crash sensor 60. In this situation, responsive to a crash detected by the crash sensor 60, the control module 14 generates a signal 70 which is operatively coupled to one or more initiators 72 of one or more gas generators 32 mounted in an air bag inflator module 16, thereby controlling the actuation of the air bag inflator module 16 so as to inflate the air bag 30 as necessary to protect the occupant 15 from injury which might otherwise be caused by the crash. The electrical power necessary to carry out these operations is provided by a source of power 33, preferably the vehicle battery. An occupant 15 with their torso against or proximate to the seat back 46 is in a suitable position for the deployment of an air bag inflator module 16 responsive to a crash, and objects or limbs proximate to the air bag inflator module 16 can be ignored, and therefor need not be sensed by the radar module 12.

If the first electric field sensor 100 detects an occupant 15 is seated on the vehicle seat 17, but second range/proximity sensor 222 does not detect the occupant 15 seated with their torso proximate to the seat back 46, then the control module 14 enables the radar module 12 to measure the distance or proximity of the occupant 15 relative to the air bag inflator module 16. If the radar module 12 detects an occupant 15 within the at-risk zone 204 of the air bag inflator module 16, then the control module 14 disables the air bag inflator module 16 from inflating responsive to a crash detected by the crash sensor 60.

When enabled, the radar module 12 may be activated either continuously; intermittently; or responsive to the likelihood of a crash, e.g. responsive to an acceleration sensed by the crash sensor 60 exceeding a relatively low level, or a signal from a crash safing sensor, a crash anticipation sensor, or a signal related to vehicle braking.

The first electric field sensor 100 and the second range/proximity sensor 222, if both are present, can be configured to share information, for example for diagnostic purposes. For example, if the second range/proximity sensor 222 consistently identifies an occupant 15 near to the seat back 46, but the first electric field sensor 100 doesn't sense an occupant 15, there could be a fault in the system. Furthermore, first electric field sensor 100 and/or the second range/proximity sensor 222 can each be similarly diagnosed using measurements from the radar module 12.

In accordance with yet another aspect of the instant invention, the second occupant sensor 200 identifies the associated seat occupancy scenario, for example whether the seat occupancy is such that the air bag inflator module 16 should be disabled, for example if the passenger seat is empty or if a rear facing infant seat is present. If the seat occupancy scenario is such that the air bag inflator module 16 is preferably disabled, then responsive to the second occupant sensor 200, the radar module 12 remains inactive until the seat occupancy scenario changes. The occupant detection systems disclosed and claimed in the aforementioned patent applications that have been incorporated by reference provide examples of a second occupant sensor 200 that can be used to identify seat occupancy scenarios in accordance with the instant invention. Other examples of sensors that can be used as a second occupant sensor 200 include a weight-based sensor, a capacitive sensor in the seat bottom, a vision-based system, ranging systems using ultrasonics or infrared, or a seat bottom pattern recognition system using force sensing resistors or bend sensors, or any combinations of these aforementioned sensors, together with an associated algorithm for identifying the seat occupancy scenario from the sensed information.

Figure 12:
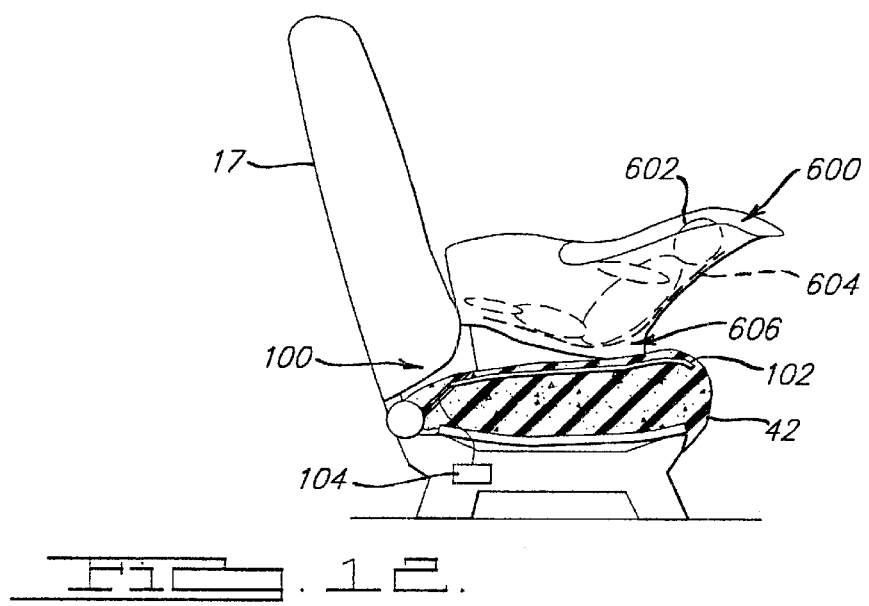
FIG. 12 illustrates a child in a typical rear facing child seat placed on a vehicle seat incorporating an electric field sensor as a second occupant sensor in accordance with the instant invention.

The first electric field sensor 100 can be used to detect a rear facing child or infant seat (RFIS) 600 because the child 602 in a rear facing child seat does not have a large surface of its body very near to the seat bottom 42 and the capacitive sensing pad 102 contained therein. For example, FIG. 12 illustrates the orientation of a child 602 in a typical rear facing infant seat 600. The seating contour 604 inside the rear facing child or infant seat 600 is such that the buttocks of the child 602 is closest to the seat bottom 42 of the vehicle seat 17. Usually there is a significant gap 606, up to several inches, between the child 602 and the seat bottom 42 of the vehicle seat 17. Since a child seat 600 is made of plastic, the seat itself does not substantially influence the electric field sensor 100. Even for a rear facing infant seat 600 for which the gap 606 between the child 602 and the seat bottom 42 of the vehicle seat 17 is relatively small, the inside seating contour 604 still creates a significant gap between the capacitive sensing pad 102 and all parts of the child 602 except the buttocks. Since only a small portion of the surface of the child 602 is near to the capacitive sensing pad 102, the capacitance measured by the electric field sensor 100 is relatively low, and more particularly, less than the threshold capacitance, $C_{norm}$.

One potential weakness of an electric field sensor 100 is the significant effect that liquids proximate to the electrode 103 can have on the capacitance of the electrode 103 with respect to the circuit ground 105, or with respect to a second electrode. For example, liquids spilled on and absorbed by the foam cushion 44 can increase the capacitance of the electrode 103 with respect to the circuit ground 105. Referring to FIG. 13, the electric field sensor 100 can be adapted to reduce the effect of a wetting of the foam cushion 44 by incorporating a driven shield 704 and/or a ground plane 706 under the sensor electrode 702 in an alternate capacitive sensing pad 102.1. The driven shield 704 is simply a second conductor under the conductor of the sensor electrode 702 that is driven at the same potential as the sensor electrode 702. The result will be that there is no electric field between the sensor electrode 702 and the driven shield 704. The driven shield 704 eliminates the capacitance sensing capability of the capacitive sensing pad 102.1 on the side of the sensor electrode 702 where the driven shield 704 is located. The capacitive sensing pad 102.1 is further improved with a ground plane 706 under the driven shield 704 so that the circuit driving the driven shield 704 drives a consistent load.

As distinguished from the capacitive proximity sensor of U.S. Pat. No. 5,166,679, the driven shield 704 and/or ground plane 706 are for example near to or slightly larger than the sensor electrode 702, and are provided to minimize the effects of liquid in the foam cushion 44 below the driven shield 704 and/or ground plane 706 on the capacitance of the sensor electrode 702, rather than to extend the range and sensitivity of the electric field sensor. The driven shield 704 and the sensor electrode 702 essentially covers the entire area to be sensed on the vehicle seat 17.

Alternately, the elements of the capacitive sensing pad 102 distributed sparsely across the vehicle seat 17, thereby covering a smaller area than the entire area to be sensed on the vehicle seat 17. One of ordinary skill in the art will recognize that the capacitive sensing pad 102, and the elements thereof, can be embodied in a variety of shapes without departing from the teachings of the instant invention.

The capacitance of the capacitive sensing pad 102 relative to circuit ground 105 is relatively small, for example less than about 300 picofarads. The temperature range that is possible in an automotive environment can significantly affect the components of the sensing circuit 106, causing drift that can be erroneously interpreted as a measurement that could enable the safety restraint system 38 to be erroneously enabled by the control module 14. The effects of this drift can be mitigated by incorporating a temperature stable reference capacitor in the sensing circuit 106 that is switched in place of the sensing electrode 103 so as to provide a means for making comparative capacitive measurements. Since the reference capacitor can be selected such that its value is very stable over temperature, any drift can be identified and quantified, and this information can be used to alter the decision threshold.

Referring to FIG. 14, illustrating an exemplary sensing circuit 106, an oscillator 802 generates an oscillating signal, for example a sinusoidal signal, that is filtered by a first bandpass filter 804 so as to create a first oscillating signal 806. The first oscillating signal 806 is applied to a capacitive voltage divider 808 comprising capacitor C1, resistors R1 and R2, and one or more capacitive elements to be measured, selected from the group consisting of the capacitive sensing pad 102, a first reference capacitor CR1, and a second reference capacitor CR2, wherein the capacitive elements to be measured are included or excluded responsive to the states of respective FET switches Q1a, Q1b, Q2a, Q2b, Q3a, and Q3b. Capacitor C1, resistors R1 and R2, and the FET switches Q1a, Q2a, and Q3a—that when active switch in the respective capacitive elements to be measured,—are all connected to one another at a first node 810, which is connected to the input 812 of a voltage follower U1. The output 814 of the voltage follower U1 is connected to FET switches Q1b, Q2b, and Q3b that when active, switch out the respective capacitive elements so as to not be measured. The activation of the FET switch elements of FET switch pairs Q1a and Q1b, Q2a and Q2b, and Q3a and Q3b are respectively mutually exclusive. For example if FET switch Q1a is activated or closed, then FET switch Q1b is deactivated or open. A capacitive element being measured adds to the capacitance at the first node, thereby affecting the strength of the signal at the input 812 to the voltage follower U1. A capacitive element not being measured is disconnected from the first node by its respective first FET switch element, and connected to the output 814 of the voltage follower U1 by its respective second FET switch element, wherein, in accordance with the characteristics of the associated operational amplifier of the voltage follower U1, the output 814 of the voltage follower U1 follows the signal of the first node without that respective capacitive element connected, and voltage follower U1 provides a current through the associated capacitive element through the second respective FET switch element. Moreover, when the respective second FET switch element is activated, the source and drain of the respective first FET switch element are separately coupled to the respective operational amplifier inputs, so that to each is applied the same potential, thereby eliminating the effect of the capacitance of the respective first FET switch on the capacitance measurement.

The output 814 of the voltage follower U1 is then coupled to a second bandpass filter 816 of the same pass band as the first bandpass filter 804, the output of which is detected by a detector 818 comprising diode D1, resistor R3 and capacitor C2, and filtered by a first low pass filter 820. The output 822 of the first low pass filter 820 has a DC component corresponding to the capacitance at the first node 810. This DC component is filtered by blocking capacitor C3, and the resulting signal is filtered by a second low pass filter 824 to provide the amplitude 826 of the oscillating signal at the first node 810, which is related to the total capacitance at that location. The blocking capacitor C3 is adapted so as to provide for a transitory measurement of the amplitude 826.

In operation, a microprocessor U2 controls the activation of FET switches Q1a, Q1b, Q2a, Q2b, Q3a, and Q3b, for example in accordance with the control logic illustrated in FIG. 15. With the first reference capacitor CR1 switched in by microprocessor U2, i.e. with Q2a activated and Q2b deactivated, the controller measures a first amplitude. Then with the second reference capacitor CR2 also switched in by microprocessor U2, the controller measures a second amplitude corresponding to an incremental increase of capacitance at the first node by the capacitance of capacitor CR2. Then the controller computes a sensitivity factor in Volts/picofarad given the known values of capacitance of capacitors CR1 and CR2. Then, the microprocessor U2 switches out the first CR1 and second reference capacitor CR2, switches in the capacitive sensing pad 102, measures a third amplitude, and calculates the capacitance of the capacitive sensing pad 102 using the calculated sensitivity factor. The control module 14 compares this capacitance with a threshold so as to discriminate normally seated occupants from other seat occupancy conditions. If a normally seated occupant 15 is present, and if the second range/proximity sensor 222 does not disable the safety restraint system, the restraint actuator 39 is actuated responsive to the detection of a crash by the crash sensor 60. Whereas FIG. 14 illustrates the microprocessor U2 and control module 14 as separate elements that communicate with one another, alternate arrangements are possible. For example, both may be combined in one controller, or the microprocessor may be adapted to sense the amplitude measurements, calculate the capacitance of the capacitive sensing pad 102 with respect to circuit ground 105, and then output only this capacitance value to the control module 14. The values of capacitance for capacitors C1, CR1, and CR2 are, for example, adapted to maximize the dynamic range of the capacitance measurement over the range of expected capacitances of the capacitive sensor 102.

The capacitive sensing pad 102 is modeled as a first capacitance CS1 in parallel with a series combination of a second capacitance CS2 and a resistance RS, wherein the resistance RS is inversely related to the wetness of the seat. The capacitance of the capacitive sensor is dominated by CS1 for a dry seat, but becomes affected by CS2 and RS as the wetness of the seat increases.

Referring to FIGS. 16a and 16b, the sensitivity to rear facing infant seats of elementary capacitive sensing pad 102 comprising a continuous conductive sheet can be reduced by the modification shown in FIG. 16b, particularly for a rear facing child or infant seat 600 that leaves only a small gap 606 between the capacitive sensing pad 102.1 and the child 602. Referring to FIG. 16b, the area on the child seat where the gap 606 is small, when the child seat is properly installed, is usually within a zone between 225 and 300 millimeters (9 and 12 inches) from the vehicle seat back 46 and across the entire seat bottom 42. The capacitive sensing pad 102.1 is adapted to make this zone less sensitive than the remaining portion of the capacitive sensing pad 102.1 by removing regions 112 of the electrode 103 within the area of greatest sensitivity. Accordingly, this increases the differentiation between the worst case rear facing child seat signal and the normally seated adult signal. Whereas, for example, rectangular slots are illustrated in FIG. 16b, one of ordinary skill in the art will recognize that the modification to the capacitive sensing pad 102.1 within the zone can be accomplished with a variety of geometries so as provide for a similar effect on the sensitivity pattern of the capacitive sensing pad 102.1. For example FIG. 17 illustrates a plurality of rectangular areas in which the conductor is removed from the electrode 103.

Referring to FIG. 18, alternately, an electric field sensor 100 with a similarly modified sensitivity can be constructed with a plurality of capacitive sensing pads 102 within the seat bottom 42, wherein a first capacitive sensing pad 102 comprising a first electrode 103.1 only senses the zone where the gap 606 between the child and the sensor could be small, and a second capacitive sensing pad 102 comprising a second electrode 103.2 senses the remaining portion of the seat bottom 42. If the total signal is relatively low and is dominated by the signal from the first capacitive sensing pad 102, then the corresponding object on the vehicle seat 17 is likely a rear facing infant seat 600.

Figure 19:
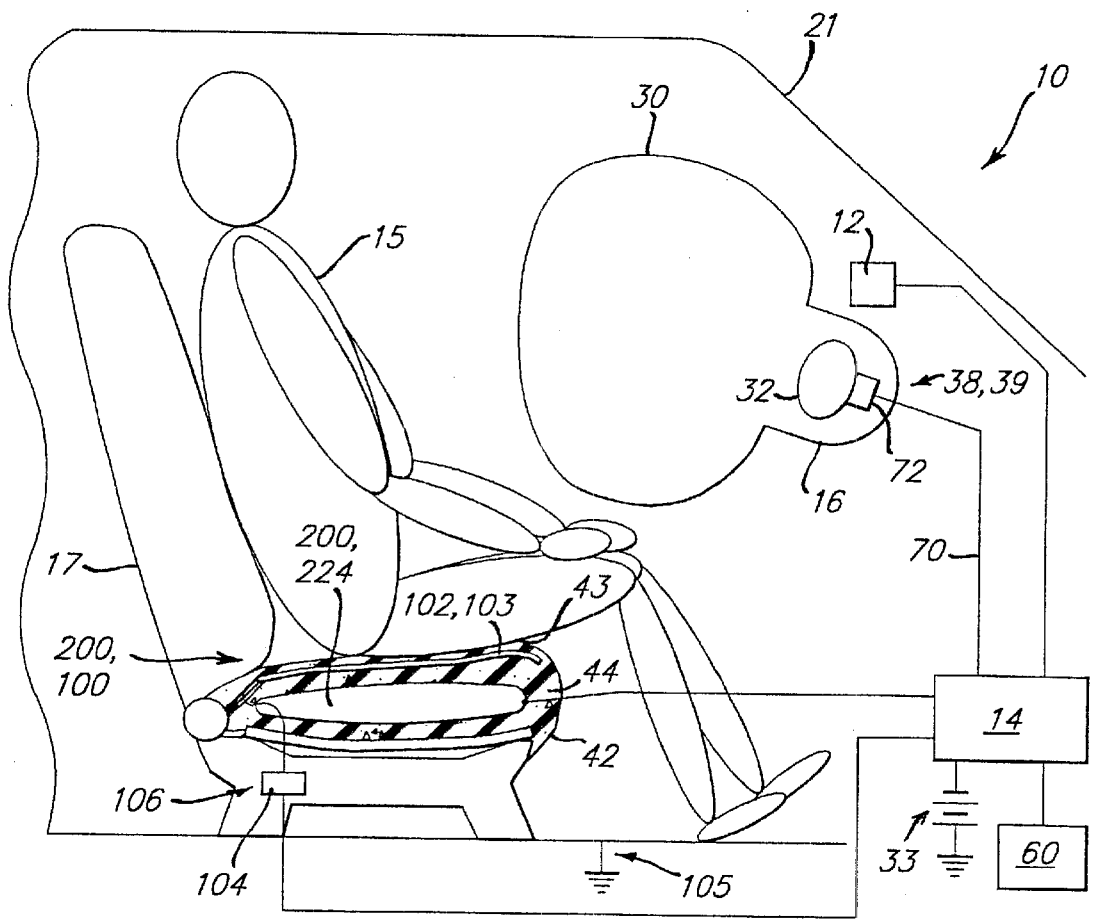
FIG. 19 illustrates another embodiment of the instant invention incorporating another embodiment of a second occupant sensor in accordance with the instant invention.

As another example, referring to FIG. 19, a second occupant sensor 200 comprises an electric field sensor 100—as described hereinabove—for identifying whether there is forward facing occupant 15 on the vehicle seat 17, and/or a seat weight sensor 224 for measuring the force upon the vehicle seat 17.

The seat weight sensor 224 measures a force upon onto the vehicle seat 17. The seat weight sensor 224 can incorporate strain gauges or other technologies including pressure sensitive resistive contacts and pressure pattern sensors (i.e. force sensitive resistors or bend sensors as manufactured by IEE) that weigh either the entire seat or just the weight on the seat bottom 42. In the case of a pressure sensing system that makes an assessment of the pressure pattern on the seat, the electric field sensor 100 can be used as an additional source of information that makes the system robust against complicating situations such as when towels are placed under child seats. The seat weight sensor 224 can be integrated with either the seat structure or the seat bottom. The electric field sensor 100 in the seat bottom 42 is readily adapted to systems incorporating force sensing resistors and bend sensors because both sensor technologies could use the same sensing mat.

In operation, an occupant 15 seated on the seat bottom 42 of vehicle seat 17 sufficiently increases the capacitance of the electric field sensor 100 sensed by the sensing circuit 106 so as to indicate to the control module 14 that an occupant 15 is seated proximate thereto. In operation, an occupant 15 seated on the seat bottom 42 of vehicle seat 17 is indicated by a sufficient increases the capacitance of the electric field sensor 100. The seat weight sensor 224 determines the weight of the occupant 15. The signals from the electric field sensor 100 and the seat weight sensor 224 are operatively coupled to the control module 14 which operates in accordance with known analog, digital, or microprocessor circuitry and software. A crash sensor 60 and the radar module 12 are also operatively coupled to the control module 14.

If the seat electric field sensor 100 and/or seat weight sensor 224 detect that either the vehicle seat 17 is either empty or is occupied by a either a sufficiently low weight occupant 15 or by an child or infant in a rear facing child or infant seat 600, then the control module 14 disables both the radar module 12 and the air bag inflator module 16. Otherwise, the radar module 12 is activated to measure the distance or proximity of the occupant 15 relative to the air bag inflator module 16. If the radar module 12 detects an occupant 15 within the at-risk zone 204 of the air bag inflator module 16, then the control module 14 disables the air bag inflator module 16 from inflating responsive to a crash detected by the crash sensor 60.

Otherwise, responsive to a crash detected by the crash sensor 60, the control module 14 generates a signal 70 which is operatively coupled to one or more initiators 72 of one or more gas generators 32 mounted in an air bag inflator module 16, thereby controlling the activation of the air bag inflator module 16 so as to inflate the air bag 30 as necessary to protect the occupant 15 from injury which might otherwise be caused by the crash.

Figure 20:
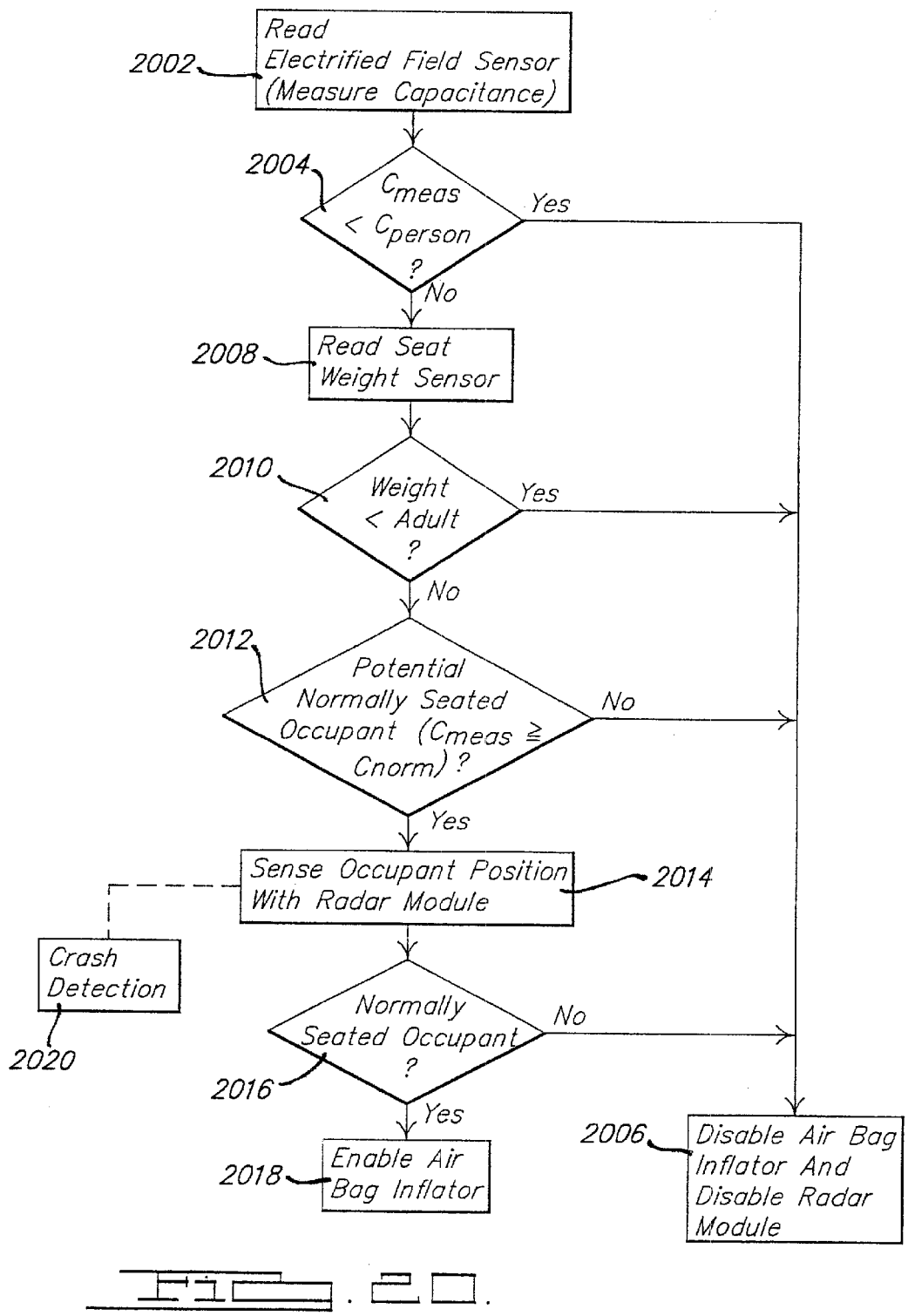
FIG. 20 illustrates an example of an algorithm in accordance with the embodiment of FIG. 19.

This process is further illustrated in FIG. 20, wherein in step (2002), a measurement from the electric field sensor 100 is read, and if in step (2004) if the capacitance, $C_{meas}$, of the associated capacitive sensing pad 102 is less than a threshold—indicating that a person is not seated against the seat bottom then the air bag inflator module 16 is disabled in step (2006). Otherwise, in step (2008), a measurement from the seat weight sensor 224 is read to determine if the occupant 15 could be a small child, and if in step (2010), if the seat weight is less than a threshold indicating the likelihood of a small child, the air bag inflator module 16 is disabled in step (2006). Otherwise, if in step (2012), if the capacitance, $C_{meas}$, of the capacitive sensing pad 102 is greater than or equal to a threshold, $C_{norm}$—responsive to the presence of a large surface of a human body is seated directly on the seat bottom 42—and if the measured weight from the seat weight sensor 224 is greater than a threshold indicating that the occupant 15 is likely an adult, then in step (2014), the radar module 12 is activated to detect the position of the occupant 15. If in step (2016) the occupant 15 is normally seated, or not located in the at-risk zone 204, then the air bag inflator module 16 is enabled in step (2018). Otherwise, the air bag inflator module 16 is disabled in step (2006). When enabled, the radar module 12 may be activated either continuously; intermittently; or responsive to the likelihood of a crash as indicated by step (2020), e.g. responsive to an acceleration sensed by the crash sensor 60 exceeding a relatively low level, or a signal from a crash safing sensor, a crash anticipation sensor, or a signal related to vehicle braking.

Accordingly, the radar module 12 remains inactive when either a normally seated occupant is detected—for which the air bag inflator module should be enabled,—or if a seat occupancy scenario is detected for which the air bag inflator module 16 should be disabled, for example if the passenger seat is empty or holds a child or rear facing infant seat The radar module 12 is activated when an occupant—for whom if normally seated the air bag inflator module 16 should be enabled—is not in a normal seating position. The second occupant sensor 200 and the radar module 12 compliment one another to accurately determine if an occupant is in the danger zone of the inflator. The radar module 12 remains inactive when the second occupant sensor 200 senses an occupant against the seat back 46, but becomes activated when the occupant is no longer normally seated, in which case the radar module 12 identifies if there is an object in the at-risk zone 204 of the air bag inflator module 16.

The associated system logic for controlling the air bag inflator module 16 is as follows:

a). If the second occupant sensor 200 detects a seat occupancy scenario for which the air bag inflator module 16 should not be deployed, then the radar module 12 remains inactive and the air bag inflator module 16 is disabled. Examples of such scenarios include an empty seat, or an infant or child seated in an infant, child, or booster seat.

b). If the second occupant sensor 200 determines that there is an occupant that might require an air bag inflator module 16 and determines that the occupant is normally seated, then the radar module 12 is inactive and the air bag inflator module 16 is enabled.

c). If the second occupant sensor 200 determines that there is an occupant that might require an air bag inflator module 16 and determines that the occupant is not normally seated then, the radar module 12 becomes active and determines the position of the occupant as follows:

1) If there is an occupant in the at-risk zone 204, the radar module 12 communicates this to the control module 14, and continues to monitor the at-risk zone 204, and communicate the results thereof, until the occupant 15 is "in-position" once again, or the static situation changes; otherwise 2) If there is no occupant in the at-risk zone 204, the radar module 12 communicates this to the control module 14, and continues to look for an occupant 15 in the at-risk zone 204 until the second occupant sensor 200 determines that the occupant 15 is once again, normally seated and "in-position", or the situation changes. If during this extended monitoring time period, the radar module 12 senses an occupant 15 in the at-risk zone 204, this information is communicated to the control module 14.

Accordingly, the air bag inflator module 16 is enabled during most "newspaper cases" (i.e. when the passenger is holding a newspaper or other object in the at-risk region.). The above system logic can also be used with air bag proximity technologies other than radar (capacitive sensing, ultrasonic ranging, infrared ranging), to enable the air bag during newspaper cases.

Inadvertent non-deployments of the air bag inflator module 16 may be prevented by providing a delay between the time that the second occupant sensor 200 determines that an occupant 15 has moved from a normally seated position and the time that the air bag is disabled, even if the radar module 12 identifies an occupant 15 inside the at-risk zone 204. The delay may be adapted to continue enabling the air bag inflator module 16 for example up to approximately 200 milliseconds after the occupant 15 has moved from a normally seated position, so as to keep the air bag inflator module 16 enabled until a firing signal is generated by the crash sensor 60 responsive to the crash, wherein the firing signal is generated at a "time-to-fire" (TTF) following the beginning of the crash. This delay also provides for deployment in most cases involving pre-impact braking causing the occupant 15 to move from a normal seating position, but not sufficiently far to be out-of-position at the time of deployment. This delay can be set such that an occupant 15 could not actually be out-of-position at the time of deployment, given that the occupant 15 was known to be normally seated at a time less than for example 200 milliseconds prior to the time of deployment. This delay allows the suppression system to ignore the limbs in the at-risk zone 204 during most cases when the occupant's head/torso are not actually out-of-position. The particular delay value depends upon the particular vehicle interior geometry and upon assumptions about vehicle accelerations before and during a crash, and is preferably adapted so that a small occupant 15 would not be in the at-risk zone 204 when the air bag is still enabled because of the delay.

One of ordinary skill in the art will appreciate that the instant invention can be utilized with other types of safety restraint systems, besides air bag inflators, that are amenable to controllable actuation. Furthermore, the associated radar module 12 may be located anywhere from which the position of an occupant 15 can be detected so as to determine if the occupant 15 is at risk of injury from the safety restraint system 38. Yet further, the range/proximity sensor 22 can comprise any kind of non-radar sensor that senses the proximity of an occupant 15 to the at-risk zone 204 of the safety restraint system 38.

In accordance with the embodiments of the instant invention in which the radar module 12 is actuated in anticipation of a crash, the activation sensor for activating the radar module 12 could comprise any kind of sensor that anticipates a crash, including for example a crash acceleration sensor as described hereinabove; a predictive collision sensor for example using microwave, optical, ultrasonic radar sensors directed outside the vehicle 21, or a braking sensor. The activation sensor may be susceptible to false activations—as would occur from a braking sensor—without causing any adverse consequences.

Furthermore, the radar module 12 and activation sensor may be adapted so that the radar module 12 is always active, but at a duty cycle or sampling rate that is responsive to the activation sensor. Accordingly, for example, the radar module 12 can be turned on for an interval of sufficient length, for example 2 msec, to make a range measurement, and then remain off for a period of time depending upon whether the activation sensor is activated. For example, if the activation sensor were not activated, then the dwell time of the radar module 12 would be 200 msec, whereas if the activation sensor were activated, radar module 12 would be operated continuously. Accordingly, the radar module 12 provides a continuous measure of occupant position, the effective sampling rate of which is increased when a crash is anticipated. This provides for reduced exposure of an occupant 15 to microwave energy than if the radar module 12 were continuously activated at the maximum duty cycle.

While this invention describes the use of a single radar module 12 near the air bag inflator module 16 to identify occupant position, the overall system could use more than a single radar module 12. For example, a combination of multiple radar modules 12 at multiple locations within the vehicle interior could be used to identify the location of the occupant's head/torso. A radar module 12 with the ability to give angular information could be located near, or behind, the headliner along the longitudinal centerline of the vehicle 21. Alternatively, a combination of two (or three) radar module 12 spaced apart by several inches and located above the headliner could use triangulation to locate the occupant's head. Any of these combinations could be triggered like the single radar module 12 in the description above.

Another variation uses the radar module 12 to identify that the occupant 15 is out-of-position for a side air bag deployment. For example, an "in-position" sensor that senses the occupant's head position could trigger a radar module 12 near the side air bag when the head moves toward the side air bag or moves out of the "in-position" sensor's sensing range.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the fill breadth of the appended claims and any and all equivalents thereof.

We claim:

1. A system for detecting an occupant in a vehicle and for controlling a safety restraint system responsive thereto, comprising:

a. a radar range sensing system for sensing the position of an occupant on a seat in the vehicle;
   b. a controller in communication with said radar range sensing system for controlling the activation of the safety restraint system; and
   c. an activation sensor that is activated when an object is within a region proximate to the safety restraint system, wherein an occupant positioned within said region would be at risk of injury from the safety restraint system, said activation sensor is continuously operative when the safety restraint system is capable of being activated, and said activation sensor is in communication with said radar range sensing system, whereby said radar range sensing system is activated responsive to the activation of said activation sensor.

2. A system for detecting an occupant in a vehicle and for controlling a safety restraint system responsive thereto as recited in claim 1, wherein said activation sensor is selected from the group consisting of a capacitive sensor, an ultrasonic sensor, a passive infrared sensor, and an active infrared sensor.

3. A system for detecting an occupant in a vehicle and for controlling a safety restraint system responsive thereto as recited in claim 1, wherein the safety restraint system comprises an air bag inflator module and said activation sensor is mounted proximate to a deployment door portion of said air bag inflator module.

4. A system for detecting an occupant in a vehicle and for controlling a safety restraint system responsive thereto as recited in claim 2, wherein said activation sensor comprises an ultrasonic sensor, said ultrasonic sensor generates a beam of ultrasonic wave energy, and said beam of ultrasonic wave energy is directed towards said seat.

5. A system for detecting an occupant in a vehicle and for controlling a safety restraint system responsive thereto as recited in claim 4, wherein said beam of ultrasonic energy comprises a chirped frequency signal.

6. A system for detecting an occupant in a vehicle and for controlling a safety restraint system responsive thereto as recited in claim 4, wherein said ultrasonic sensor comprises a single transducer that both transmits and receives said ultrasonic wave energy, and said transducer transmits a pulse of ultrasonic wave energy responsive to receiving an echo of a previously transmitted said pulse of ultrasonic wave energy.

7. A system for detecting an occupant in a vehicle and for controlling a safety restraint system responsive thereto as recited in claim 2, wherein said activation sensor comprises an ultrasonic sensor, said ultrasonic sensor generates a beam of ultrasonic wave energy, and said beam of ultrasonic wave energy is directed across said seat into a region that would be occupied by an occupant.

8. A system for detecting an occupant in a vehicle and for controlling a safety restraint system responsive thereto as recited in claim 3, wherein said activation sensor comprises a capacitive sensor with at least one electrode, and at least one of said at least one electrode is incorporated in said deployment door portion of said air bag inflator module.

9. A system for detecting an occupant in a vehicle and for controlling a safety restraint system responsive thereto as recited in claim 8, wherein said activation sensor comprises a capacitive sensor with at least one electrode and said radar range sensing system operates through an orifice in at least one of said at least one electrode.

10. A system for detecting an occupant in a vehicle and for controlling a safety restraint system responsive thereto as recited in claim 1, wherein said activation sensor is calibrated responsive to said radar range sensor.

11. A system for detecting an occupant in a vehicle and for controlling a safety restraint system responsive thereto as recited in claim 1, wherein said activation sensor is adapted to distinguish between an animate and an inanimate object.

12. A system for detecting an occupant in a vehicle, comprising:
   a. a radar range sensor mountable in a vehicle, wherein said radar range sensor is adapted to sense a position of an occupant in said vehicle;
   b. an occupant sensor mountable in said vehicle, wherein said occupant sensor is adapted to sense a presence or position of an occupant in a seat of said vehicle; and
   c. a means for controlling an activation of said radar range sensor, wherein said means for controlling the activation of said radar range sensor is operatively coupled to said occupant sensor and controls an activation of said radar range sensor responsive to a signal from said occupant sensor.

13. A system for detecting an occupant in a vehicle as recited in claim 12, wherein said occupant sensor comprises a range/proximity sensor adapted to sense a position of said occupant relative to a seat back of said seat, and said means for controlling the activation of said radar range sensor disables said radar range sensor responsive to a detection by said range/proximity sensor of an occupant proximate to said seat back of said seat.

14. A system for detecting an occupant in a vehicle as recited in claim 13, wherein said means for controlling the activation of said radar range sensor enables said radar range sensor responsive to a detection by said range/proximity sensor of an occupant displaced from said seat back of said seat by a distance greater than a threshold.

15. A system for detecting an occupant in a vehicle as recited in claim 13, wherein said range/proximity sensor is selected from an electric field sensor in said seat back, an ultrasonic ranging sensor in said seat back, an infrared sensor in said seat back, and a vision sensor, wherein said electric field sensor comprises an electrode.

16. A system for detecting an occupant in a vehicle as recited in claim 12, wherein said occupant sensor comprises an electric field sensor mountable in a seat bottom of said seat, said electric field sensor comprises an electrode, and said means for controlling the activation of said radar range sensor disables said radar range sensor responsive to a detection by said electric field sensor of an infant or child in an infant or child seat when said infant or child seat is placed on said vehicle seat.

17. A system for detecting an occupant in a vehicle as recited in claim 12, wherein said occupant sensor comprises a seat weight sensor mountable in a seat bottom of said seat, said seat weight sensor generates a signal responsive to a force upon said seat base, and said means for controlling the activation of said radar range sensor disables said radar range sensor responsive to a detection by said seat weight sensor of said force being less than a first threshold.

18. A system for detecting an occupant in a vehicle as recited in claim 17, wherein said means for controlling the activation of said radar range sensor enables said radar range sensor responsive to a detection by said seat weight sensor of said force being greater than a second threshold.

19. A system for detecting an occupant in a vehicle as recited in claim 13, further comprising:
   a. a safety restraint system, the activation of which is controllable; and
   b. a safety restraint controller operatively coupled to said safety restraint system, wherein responsive to said detection by said range/proximity sensor of an occupant proximate to said seat back of said seat, said safety restraint controller enables said safety restraint system for actuation responsive to a signal from a crash sensor.

20. A system for detecting an occupant in a vehicle as recited in claim 16, further comprising:
   a. a safety restraint system, the activation of which is controllable; and
   b. a safety restraint controller operatively coupled to said safety restraint system, wherein responsive to said detection by said electric field sensor of an infant or child in an infant or child seat when said infant or child seat is placed on said vehicle seat, said safety restraint controller disables said safety restraint system from actuation responsive to a signal from a crash sensor.

21. A system for detecting an occupant in a vehicle as recited in claim 17, further comprising:
   a. a safety restraint system, the activation of which is controllable; and
   b. a safety restraint controller operatively coupled to said safety restraint system, wherein responsive to said a detection by said seat weight sensor of said force being less than said first threshold, said safety restraint controller disables said safety restraint system from actuation responsive to a signal from a crash sensor.

22. A system for detecting an occupant in a vehicle as recited in claim 12, further comprising:
   a. a safety restraint system, the activation of which is controllable; and
   b. a safety restraint controller operatively coupled to said safety restraint system, wherein responsive to a signal from said radar range sensor, said safety restraint controller controls whether said safety restraint system can be actuated responsive to a signal from a crash sensor.

* * * * *

UNITED STATES PATENT AND TRADEMARK OFFICE
CERTIFICATE OF CORRECTION

PATENT NO. : 6,598,900 B2
DATED : July 29, 2003
INVENTOR(S) : James G. Stanley et al.

It is certified that error appears in the above-identified patent and that said Letters Patent is hereby corrected as shown below:

<u>Title page,</u>
Item [57], ABSTRACT,
Line 11, "and" should be changed to -- an --.

<u>Column 12,</u>
Line 20, "is" should be changed to -- can --.

<u>Column 14,</u>
Line 49, "d." should be changed to -- c. --.

<u>Column 22,</u>
Line 49, "increases" should be changed to -- increase in --;
Line 58, the second occurrence of "either" should be deleted;
Line 59, "a" should be deleted before "either"; and
Line 60, "an" should be deleted before "child".

<u>Column 27,</u>
Line 52, "base" should be changed to -- bottom --.

Signed and Sealed this

Eighth Day of February, 2005

JON W. DUDAS
*Director of the United States Patent and Trademark Office*